Aug. 28, 1962  R. HILLER ET AL  3,051,793
ELECTRONIC SELECTION CIRCUITS
Filed March 18, 1958  4 Sheets-Sheet 1
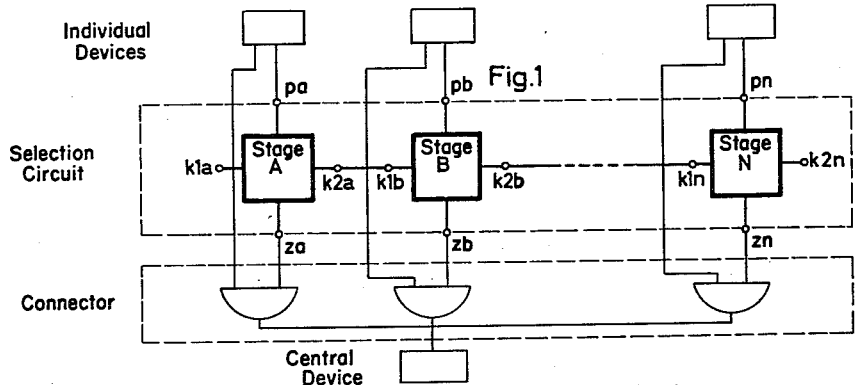
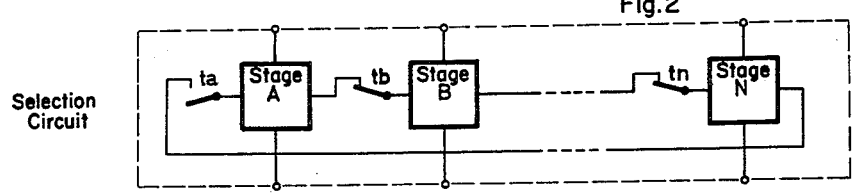
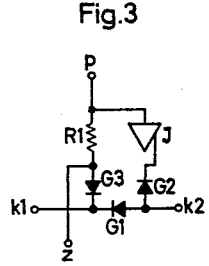
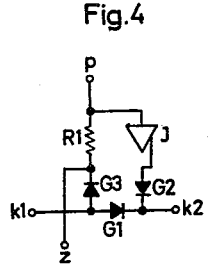
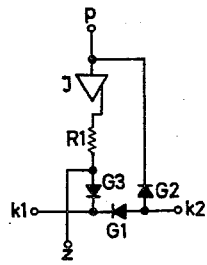
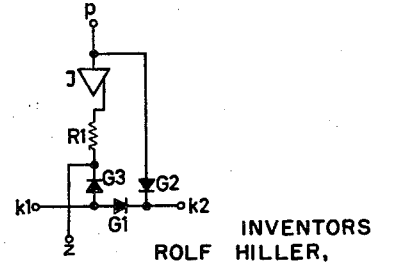
INVENTORS
ROLF HILLER,
KARL RUTKOWSKI,
WERNER KRÄGELOH,
DIETER VOEGTLEN &
SIEGFRIED ZAHLHAAS
BY
ATT'Y.

INVENTORS
ROLF HILLER,
KARL RUTKOWSKI,
WERNER KRÄGELOH,
DIETER VOEGTLEN &
SIEGFRIED ZAHLHAAS

BY

ATT'Y

Aug. 28, 1962   R. HILLER ET AL   3,051,793
ELECTRONIC SELECTION CIRCUITS
Filed March 18, 1958   4 Sheets-Sheet 4
Fig.18
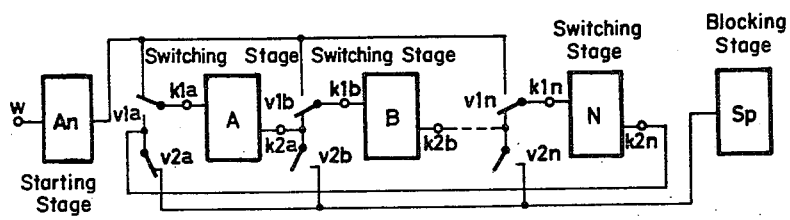
INVENTORS
ROLF HILLER,
KARL RUTKOWSKI,
WERNER KRÄGELOH,
DIETER VOEGTLEN &
SIEGFRIED ZAHLHAAS
BY 
ATT'Y United States Patent Office 3,051,793
Patented Aug. 28, 1962

3,051,793
ELECTRONIC SELECTION CIRCUITS
Rolf Hiller, Starnberg, Upper Bavaria, Karl Rütkowski, Munich-Grosshesselohe, and Werner Krägeloh, Dieter Voegtlen, and Siegfried Zahlhaas, Munich, Germany, assignors to Siemens & Halske Aktiengesellschaft, Berlin and Munich, a corporation of Germany
Filed Mar. 18, 1958, Ser. No. 722,357
Claims priority, application Germany Mar. 20, 1957
54 Claims. (Cl. 179—18)

This invention is concerned with electronic selection circuits for signalling systems.

In signalling systems, for example, communication systems, telephone systems and electronic calculating or computing systems and machines, there always recurs the problem to select from a plurality of devices one that is momentarily available for a given purpose or operation. For example, in telephone systems, the devices may be switching means for extending connections over selecting stages or common devices such as markers or registers; in the case of computing or calculating systems, the devices may be storage devices of various kinds which continually transmit to apparatus taking care of selecting operations, momentarily present information.

Problems of the indicated kind have until now been largely solved by means of electromagnetic switches comprising movable setting members, or by means of relay switches. The operating speed of these switches and their capacity are relatively narrowly limited due to the masses that have to be moved and, therefore, various proposals have been made to replace the electromagnetic switches by devices adapted to operate practically without inertia. Among the proposals made is the suggestion to replace the switches by a cathode ray tube. While exhibiting high operating speed, the cathode ray tube requires great expenditure for the control of its operation and its outlets have internal resistance which is for most intances of use too high. More favorable with respect to expenditure and results obtained are previously proposed arrangements in which the selected device is marked by energization of a relay which is associated therewith under control of cold cathode tubes excited for this purpose. While the result of each selection operation is in one of these arrangements, due to its peculiarities, based upon statistical data of gas discharges, excluding the required, defined, sequence of seizure, such sequence is in another arrangement secured by integrating members having from stage to stage different time constants. Another previously proposed electronic switch operates likewise with fixed seizure sequence. This switch utilizes an impulse which is conducted to the first selection stage as a triggering impulse, such impulse being successively regenerated from each selection stage whose associated device has already been seized, and conducted to the next stage, until it effects in a selection stage with an idle device the switching operation required for the marking.

A typical characteristic of the above indicated arrangements, insofar as they provide for the generally indispensable defined seizure sequence, resides therein that the testing of the individual devices connected to the switch, is always effected in timing sequence, the devices accordingly being tested one after the other. These arrangements can in this respect be regarded as constituting electronic images of mechanical rotary switches and, accordingly, they suffer the drawback that the time for carrying out a selection operation is not always constant, such time depending upon the position of the first idle devices in a series of devices, and such time being the longer the longer the distance from the zero position of the switch, that is, from the point at which the testing operation starts.

The problem underlying the invention is to provide an arrangement utilizing all advantages present in electronic means but free of the analogy to the rotary switch and employing the new basic thought to utilize for each possible selection operation always the identical time regardless of the position assumed in the series of all devices that may be present by the device to be finally marked. This time shall moreover have the smallest possible value and the operations shall be achieved with least possible expenditure. The arrangement to be provided shall furthermore be adapted to operate under conditions of the devices cooperatnig therewith.

The problem indicated above is solved by the electronic selection circuit which will be explained below.

The electronic selection circuit according to the invention comprises a plurality of switching stages corresponding in number to the number of devices connected therewith. Each device connects to its associated stage a potential of a magnitude which indicates its momentary busy or idle condition. These magnitudes, therefore, can occur as two values, namely, as a potential indicating busy condition or as a potential indicating idle condition. For the marking of a device determined by the selection operation, the selection circuit conducts to the device a marking potential which distinguishes in its magnitude from the neutral potential conducted to all remaining devices.

Each switching stage has a testing input to which the associated device transmits the potential indicating its momentarily prevailing idle or busy condition, and also has a marking output over which the marking potential required for the marking of the associated device is conducted to such device. Each switching stage has moreover a coupling input and a coupling output, whereby potential conducted to the coupling input can affect the corresponding switching stage while the potential delivered over the coupling output can affect other switching stages. The respective potentials of the coupling input and coupling output can assume two values corresponding to the two values that may be assumed by the potential respectively conducted to the testing input and delivered by the marking output, namely, idle and busy potential and marking and neutral potential, respectively. One of the two values, the busy or blocking potential, can effect an operation which is omitted in the case of the idle potential.

It is characteristic for each switching stage that it comprises a testing input for receiving a potential signifying idle or busy condition, a marking output for extending a potential signifying neutral condition or marking condition, a coupling input and a coupling output for respectively receiving and extending a potential signifying release or blocking, a first gate having a first input connected with said coupling input and having an output connected with said coupling output, said first gate extending the blocking potential from said coupling input to said coupling output, a second gate of a type complementary to said first gate, said second gate being jointly controlled by the potentials at said coupling input and said testing input and extending a marking potential to said marking output responsive to a release potential and an idle potential respectively extended to said coupling input and to said testing input, and an inverter for adapting the potential at said coupling input or said testing input for use in said first or said second gate to provide thereby a blocking potential at a second input of said first gate in response to a release potential and an idle potential extended respectively to said coupling input and to said testing input.

The various objects and features of the invention will appear from the description which will presently be rendered with reference to the accompanying drawings showing examples of electronic selection circuits and arrangements of switching stages exhibiting the characteristic features referred to. The approximate potential identity appearing in one case between coupling output and coupling input is in one kind of switching stages effected by a rectifier and in the other kind by a transistor. In the drawings, FIG. 1 shows a selection circuit with a marking sequence always starting from a fixed zero point;

FIG. 2 illustrates a selection circuit with a marking sequence starting from an arbitarily fixed zero point;

FIGS. 3 to 9 represent switching stages in which the approximate potential identity between coupling output and coupling input is effected by means of rectifiers; FIGS. 3 to 6 showing switching stages in which the complementary value is produced by the potential conducted to the testing input; FIG. 7 showing a switching stage in which the complementary value is produced by the potential conducted to the coupling input; FIG. 8 showing a switching stage in which the complementary value is produced jointly by the potentials respectively conducted to the testing input and the coupling input; and FIG. 9 showing a switching stage in which the complementary value is produced by the potential appearing at the marking output;

FIGS. 10 to 12 show switching stages in which the approximate potential identity between coupling output and coupling input is produced by means of transistors; FIG. 10 showing a switching stage with one transistor; FIGS. 11 and 12 showing switching stages each with two transistors;

FIG. 18 shows an arrangement of a selection circuit employing features according to FIG. 2 and other features.

Figure 7:
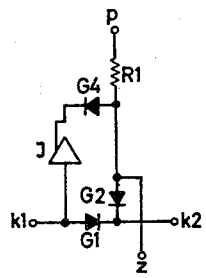

The number of switching stages shown in the selection circuits has been limited to a number sufficient to support understanding. Attention is, however, called to the fact that neither the principle underlying the basic arrangement of selection stages nor the arrangement of switching stages shown as examples requires within customary practical use a limitation as to the number of stages of the selection circuit and therewith limitation of the number of devices connected thereto.

The previously indicated characteristic behavior of the switching stage according to the invention, so far as the delivery of potential depending upon input potential is concerned, may also be stated in the manner of three criteria, namely (1) when the coupling input has release potential and the testing input has idle potential, the marking output will have marking potential and the coupling output will have blocking potential; (2) when the coupling input has release potential and the testing input has busy potential, the marking output will have a neutral potential and the coupling output will have release potential; and (3) when the coupling input has blocking potential, the marking output will have the neutral potential and the coupling output will have blocking potential regardless of the potential that might be on the testing input.

It shall now be explained how and in what manner a selection circuit constructed of switching stages as shown in FIGS. 1 and 2 exhibits the required previously indicated behavior according to which the marking potential will appear only as the marking output of that switching stage which is associated with the first device that carries a potential indicating that it is idle.

FIG. 1 shows in prominent lines an electronic selection circuit with a marking sequence always starting from a fixed zero point. Only the first two stages A and B and the last stage N are indicated. Each of these stages, which are structurally alike, is connected with its associated device by means of two connections comprising the testing input $p$ over which the corresponding device signals its momentary condition by supplying respectively busy or idle potential, and the marking output $z$ over which the stage delivers to the respective device marking potential, the output $z$ otherwise carrying a neutral potential. Each stage disposed between the first and last stage is connected with the respectively preceding and succeeding stage. The respectively preceding stage supplies to the respectively succeeding stage over the coupling input $k1$ the release and blocking potential which serves for the passive control of the succeeding stage, while release and blocking potential for the active control is delivered from the respective preceding stage to the succeeding stage over the coupling output $k2$. The coupling output $k2n$ of the last stage N is unconnected; the coupling input $k1a$ of the first stage A may for the time being be considered to be unconnected. Each of the switching stages A, B . . . N produces the previously mentioned characteristic behavior.

FIG. 1 also shows the devices which cooperate with the electronic selection circuit, namely, the "individual devices," each of which is to be connected with a "central device" by means of a "connector"; each "connector" being symbolically indicated by an "And" circuit, each of which will be in a position to transmit information to the "central device," from the "individual device" cooperatively associated therewith, only responsive to receiving marking potential from the associated switching stage.

The above indicated known manner of transmitting information has been included in FIG. 1 in order to illustrate the operation of the prominently drawn selection circuit according to the invention. Parts including the connectors, as well as the individual devices and the central device and the manner of interconnecting these devices do not form part of the invention.

The operation of such an electronic selection circuit shall now be explained with reference to a typical operating condition.

It shall be assumed that the first device is busy while the second and third are idle and that idle and busy conditions exist in desired combinations in connection with the remaining devices. The testing inputs $pb$ and $pc$ and testing inputs of some succeeding stages will accordingly have idle potential while busy potential will be at least on the testing input $pa$. Idle potential is also on the coupling input $k1a$ of the first stage A. The condition in case of the first stage A, with the potentials acting on the two inputs $pa$ and $k1a$ will fulfill the second criterion; accordingly, at the marking output $za$ will be neutral potential while release potential is conducted to the coupling output $k2a$ leading to the stage B. Since there is idle potential at the testing input $pb$ of stage B, the first criterion will be fulfilled for this stage, according to which marking potential is conducted to its associated device, by way of marking output $zb$, while blocking potential is conducted to the third stage over coupling output $k2b$. Therefore, the third criterion will be fulfilled for the third stage C and therewith for all following stages, according to which even stages provided with idle potential are prevented to deliver marking potential. The unequivocal results of a selection operation are, therefore, properly assured.

It will be seen from a consideration of the typical operating condition that switching stages, having the characteristic features, when interconnected as shown in FIG. 1, result in an electronic selection circuit which is operative to conduct always only to one single device a marking potential regardless of how many devices idle potential may have been delivered and how many idle and busy devices are momentarily present. The stage the coupling input $k1$ of which is left free is determined as the first in the series of stages. The zero point must be visualized as lying ahead of the first stage. The marking sequence is calculated from the zero point.

Since there is, in case of the first stage A, no passive control by a preceding stage and since there is in case of the last stage no active control of a succeeding stage, circuit simplifications may be effected in these two stages A and N, unless further operations are to be effected; such simplifications will be presently discussed.

In the selection circuit according to FIG. 1, there is, based upon fixed interconnection of the stages, a fixed zero point for the marking sequence. Since the idle device which lies nearest to the zero point will always be marked, the seizure-frequency with respect to the available devices will decrease in the direction of the marking sequence. Similar seizure frequency for all available devices may be obtained by assigning to the zero point not a fixed position in the selection circuit, but shifting it incident to each seizure attempt by one stage, thus cyclically continuously changing the marking sequence. Even when similar seizure frequency for all available devices is not desired, it may be advantageous, in certain cases, to deviate from an invariably identical marking sequence. For example, such a case may be present when the devices connected to the selection circuit are largely centralized; assuming fixed seizure frequency, always the same, namely, the first device would be marked in off-peak operation, which might result in serious blocking of calls in case of sudden increase of traffic. If it is desired to guard only against this possibility, any desired scheme may be employed for the shifting of the zero point.

FIG. 2 shows a selection circuit providing for a seizure sequence starting with an arbitrarily fixable zero point. While each stage retains its place in the seizure sequence, assuming a selection circuit with fixed zero point, permitting structural simplification with respect to the first and the last stages, in a selection circuit with arbitrarily fixable zero point, each stage can assume any position in the marking sequence. Accordingly, all stages are structurally similar. The series or chain circuit will be modified to form a loop circuit, such that the coupling input $k1$ is in each stage connected to the coupling output $k2$ of the preceding stage, employing intermediate contacts $t$, the last stage thereby taking the place of a preceding stage so far as the first stage is concerned. One of these contacts $t$ is always open interrupting the loop circuit at the corresponding point so that the stage following the open contact in the direction of marking cannot be affected so far as the delivery of a marking potential is concerned. The stage following the open contact is thus marked in the marking sequence as the first stage, the position of the open contact $t$ corresponding to the position of the zero point.

FIG. 2, so far as the operation is concerned, is fully similar to FIG. 1. A storage device is required for the control of the contacts $t$, in which the respectively required position of the zero point is determined from seizure to seizure.

In case of cyclic shifting of the marking sequence, that is, stage-wise advance of the zero point, the storage device may be a relay counting chain which is advanced after each selection operation. Suitable storage circuits may easily be found for other schemes desired for shifting the zero point position. Suitable storage means for the desired purpose are well known, do not form part of the invention, and detailed discussion and description thereof is therefore omitted.

As will be apparent from the foregoing explanations, the prevention of delivery of a marking potential at a given stage requires that such stage receive from the respectively preceding stage a blocking potential. This is the case when the corresponding preceding stage delivers to the respectively associated device the marking potential. If the individual devices are provided with very rapidly energizing means for the evaluation of the marking potentials, care must be taken in each stage to avoid double seizures by preventing delivery of the marking potential prior to delivery of the blocking potential.

The conditions under which the selection circuit has to operate may call for particular provisions to prevent double seizures. Such a case may be present when all devices, responsive to a trigger signal extended thereto in common and releasing a selection operation, transmit to the respectively associated stages of the selection circuit potential which signals their momentary idle or busy condition, and when transmittal of the corresponding signals is not effected simultaneously at all devices. For example, if the second and third devices are idle, and if the second device transmits the signal with a delay as compared with the signal transmitted by the third device, a marking potential will appear at the marking output of the third stage, such potential disappearing upon transmittal of the signal from the second stage, while the marking potential appearing delayed at the output of the second stage will be retained. Assuming now that the operatively effective energization interval of the means in the third device, which evaluates the delivery of the marking potential, is shorter than the possible delay, the third and the second devices will be successively seized, resulting in double seizure.

Another case is one in which the devices become idle at different times. Upon delivery of the idle potential, from a device lying in the marking sequence ahead of the initially first idle device and becoming idle with a delay, to the selection circuit, the latter thus receiving the idle potential with a delay, the same unfavorable conditions as in the above explained case will result for the selection circuit. The originally appearing marking potential of a stage will subsequently again change to neutral potential. Conditions resulting from such temporarily appearing marking potential may be remedied in the corresponding stage by somewhat delaying the delivery of the marking potential as compared with the delivery of the blocking potential. If the corresponding delay is at least equal to the maximum delay in the transmission of the idle or busy potential or equal to the duration of the signal causing release of a selection operation, double seizures will be avoided. The delay may in general be very slight and, therefore, will not produce any noticeable deterioration in the rapid operation of the selection circuit.

The structure of the switching stages having the characteristic features, will now be explained. It shall be established first, that the previously rendered explanations concerning these characteristic features makes it possible, by utilizing the three most important "logical" elements, known from theoretical considerations, namely, the "And" circuit, the "Or" circuit and the inverter, to construct at least an arrangement which has the desired properties. The "And" circuits are in the customary sense arrangements in which a certain initial output value appears only when certain input values are simultaneously supplied to all inputs; in the "Or" circuits, a certain output value will appear responsive to supply of a certain input value to at least one input, whereby the inputs are mutually uncoupled. Both basic elements or circuits may be realized in known manner by the use of rectifiers. "And" and "Or" circuits are to be considered as being complementary, since the circuit of one type passes into that of the other type responsive to change of polarity of the potential conducted thereto. In the case of inverters, the characteristic property is that they allot a low output value to a high input value and vice versa, whereby the respective input and output values may have the same or different average values. Known structures include switch-over contacts and phase inverting tube or transistor stages.

Upon constructing a switching stage having the characteristic features, the "And" circuits are employed at circuit portions where the appearance of a certain potential depends upon simultaneously satisfying several requirements, while inverters are employed for producing the previously mentioned complementary value of a given potential and, if desired, also for producing potentials which are needed for the use of the "And" circuits. The "Or" circuits are in accordance with known rules employed wherever reactive effects of potentials are to be prevented.

The switching stages which will now be described exhibit the characteristic features and are, therefore, adapted for constructing the selection circuits shown in FIGS. 1 and 2. The operation of these selection circuits has already been explained, and the following description can, therefore, be limited to explanations as to manner in which each embodiment of a switching stage satisfies the previously noted three criteria. As compared with switching stages constructed as indicated before of a mechanical combination of basic elements, the illustrated embodiments have the advantage that they may be constructed so as to produce the desired properties by suitable combination and with extremely small expenditure.

Switching stages will now be described with reference to FIGS. 3 to 9, in which rectifier means are used for satisfying the previously noted third criterion to provide an at least approximate potential identity between the coupling output and the coupling input. The inverters are symbolically indicated in these figures. The requirement for the inverters is, that they have with high internal impedance on the input side a low internal impedance on the output side; that they produce neither any particular amplification nor attenuation; and that the shifting of the mean or average value of the output potential, as compared with the mean value of the input potential is small as compared with the difference between the two possible values of the input or output potential. These requirements may be fulfilled in simplest manner by a transistor operatively in emitter circuit. Auxiliary means may be used to provide for the desired operation, when employing other elements which is, of course, entirely possible.

Each of the embodiments to be described comprises a single inverter. The switching stages may be subdivided into groups depending upon the potentials employed for controlling the operations of the inverters. Thus, it is possible, to control the inverter respectively by the potential of the testing input (FIGS. 3 to 6), or by the potential of the coupling input (FIG. 7), or, simultaneously by the potentials of the testing input and the coupling input (FIG. 8), or by the potential of the marking output (FIG. 9). Variations within these groups will permit adaptation of the switching stages to the most varied requirements.

For reasons of simplification, the two potentials will be referred to as "positive" and as "negative" potential, to indicate the two values which each potential may assume. These two designations always shall refer to a mean or average potential to be formed by the two values, whereby the mean value may be as desired. The corresponding values, therefore, shall be regarded in the nature of relative values. In a borderline case, one of the two potential values may disappear, meaning, that the corresponding input or output does not receive or does not deliver any defined potential at all. However, this borderline case merely represents a constructional simplification that may always be traced to a suitable defined potential and, therefore, does not constitute an exception.

FIG. 3 shows a switching stage comprising an inverter J having its input connected with the testing input $p$ and its output connected with the coupling output $k2$ by way of a rectifier G2, the latter being connected with the coupling input $k1$ by way of the rectifier G1. The marking output $z$ is connected to the coupling input $k1$ by way of rectifier G3 and with the testing input $p$ by way of resistor R1. The anodes of the respective rectifiers are connected with the coupling output $k2$ and the cathodes thereof are connected with the coupling input $k1$. The inverter J is, accordingly, controlled by the potential at the testing input $p$. Idle potential, release potential and marking potential have positive values while busy potential, blocking potential and neutral potential are negative.

Upon connecting positive idle potential to the testing input $p$ while supplying positive release potential to the coupling input $k1$, the connecting point between the resistor R1 and rectifier G3 will likewise be at positive potential, thereby connecting positive marking potential to the marking output $z$. The output potential of the inverter J which has received positive idle potential will have negative value which is transmitted to the coupling output $k2$ by way of the rectifier G2, serving as a blocking potential, the rectifier G1 preventing equalization of the potentials of the coupling input and the coupling output.

When negative busy potential is extended to the testing input $p$ and positive release potential to the coupling input $k1$, the connecting point between the resistor R1 and the rectifier G3 will receive the negative busy potential, rectifier G3 blocking the release potential, and the marking output $z$ will receive neutral potential. The output potential of the inverter J, which is controlled by the negative busy potential, assumes a positive value which is conveyed as a release potential over the blocking impedance of the rectifier G2 to the coupling output $k2$, the rectifier G1 remaining ineffective because its terminals are on the same potential. The release potential remains without effect due to the blocking impedance of rectifier G2, such release potential, as shown above, serving only the purpose of blocking the rectifier G3 of the next successive stage.

Upon connecting negative blocking potential to the coupling input $k1$, the marking output $z$ will receive neutral potential since a potential that may have been connected to the testing input $p$ will remain practically without effect due to the blocked rectifier G3 and due to the presence of the resistor R1. The negative blocking potential of the coupling input $k1$ is also impressed upon the coupling output $k2$, due to the action of the open rectifier G1, since a positive output potential that may be supplied by the inverter J, which appears upon connecting busy potential to the testing input $p$, will remain ineffective due to the blocking action of the rectifier G2.

FIG. 4 shows a switching stage which is structurally similar to the switching stage according to FIG. 3, except that the rectifiers G1, G2 and G3 are oppositely polarized. The corresponding switching stage is to be provided when negative idle potential is available and when negative marking potential is required, in which case the busy potential and the neutral potential are positive. The blocking potential assumes a positive value while the release potential is negative. The operation of this switching stage, considering, of course, changed polarity of all potentials, corresponds fully to that explained with reference to FIG. 3.

FIG. 5 shows a switching stage in which the input of the converter is connected to the testing input with the output thereof connected to marking output $z$ by way of the resistor R1 which is in turn connected with the coupling input $k1$ by way of the rectifier G3. The coupling output $k2$ is connected to the coupling input $k1$ by way of the rectifier G1 and by way of rectifier G2 to the testing input $p$. At the coupling input $k1$ are the cathodes and at the coupling output $k2$ the anodes of the rectifiers. The control of the inverter J is effected by the potential at the testing input $p$. The idle potential is negative and the marking potential is positive, the release potential being likewise positive. This switching stage distinguishes structurally from the arrangement shown in FIG. 3 by the placement of the inverter between the testing input $p$ and the marking output $z$ instead of between the testing input $p$ and the coupling output $k2$. The change, with otherwise similar operation, affects the delivery of potential at the marking output and the coupling output, whereby the inverter and the voltage source belonging to the switching stage, serving for delivery of the potential indicating the seizure condition, change places.

FIG. 6 shows a switching stage which is structurally similarly to the one illustrated in FIG. 5, with the exception that the rectifiers G1 G2 and G3 are oppositely polarized. This switching stage is to be provided when positive idle potential is available and when negative marking potential is required. The blocking potential assumes in this case a positive value while the release potential is negative. Concerning the operation, this switching stage is, considering the changed polarity of the potentials operative at the rectifiers, fully similar to the arrangement according to FIG. 5 or, considering the insertion of the inverter and the change of polarity of the potentials supplied to the testing input $p$, similar to the arrangement according to FIG. 4.

The embodiments of switching stages explained in the foregoing description show that it is possible to meet in spite of the slight expenditures all requirements that may be placed on a selection circuit constructed with such stages so far as the potentials are concerned that are respectively supplied to and delivered by the selection circuit. The property of the selection circuit which makes it independent of the polarity of the potentials gains particular importance in cooperation with devices provided with transistors because, as compared with tubes, types of both polarities (npn and pnp transistors) will be available.

FIG. 7 shows a switching stage in which the inverter J is connected on its input side with the coupling input $k1$ while the latter is connected with the coupling output $k2$ by way of the rectifier G1. The marking output $z$ is connected with the coupling output $k2$ by way of rectifier G2, with the testing input by way of resistor R1, and with the inverter J by way of rectifier G4. The cathodes of the respective rectifiers are connected with the coupling output $k2$ and with the output of the inverter. The inverter input is negatively biased by a resistor with high resistance which has not been illustrated because it is considered part of the inverter. The operative control of the inverter J therefore is effected by the potential of the coupling input $k1$. The idle potential and the marking potential have positive values while the release potential is negative. When the negative idle potential is extended to the coupling input $k1$ and the positive idle potential to the testing input $p$, the output of the inverter J will have positive potential, determined essentially by the fixed bias at its input, the rectifier G4 lying now between two points carrying identical potential, and the marking output $z$ will receive positive marking potential while the coupling output $k2$ will receive blocking potential by way of the rectifier G2. The rectifier G1 prevents equalization of the potentials of the coupling input $k1$ and coupling output $k2$.

When negative release potential is extended to the coupling input $k1$ and negative busy potential to the testing input $p$, the marking output $z$ will receive neutral potential since the rectifier G4 blocks the positive output potential of the inverter J. The coupling output $k2$ receives the negative release potential by way of the rectifiers G1 and G2 acting in blocking direction. This release potential is due to the blocking action of the rectifiers ineffective because the inverter is in each stage individually negatively biased.

When positive blocking potential is extended to the coupling input $k1$, the marking output $z$ will receive negative neutral potential because idle potential which may have been extended to the testing input $p$ breaks down at the resistor R1 due to the pass action of rectifier G4, based on the negative output voltage of the inverter J. The positive blocking potential of the coupling input $k1$ is impressed on the coupling output $k2$ by way of the rectifier G1, the rectifier G2 preventing extension of the blocking potential to the marking output.

The rectifiers of FIG. 7 may have opposite polarities, thereby providing a different arrangement which can meet the requirements of differently constructed devices connected to the switching stage. Such changed switching stage may be used when negative idle potential is available and requiring negative marking potential. The blocking potential will in such case also be negative.

Figure 8:
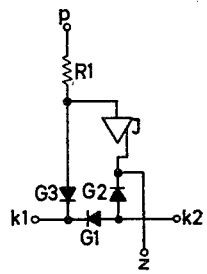
Figure 9:
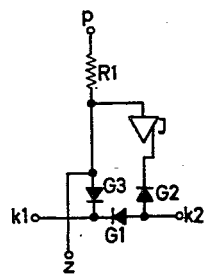

FIG. 8 shows a switching stage comprising an inverter J the input of which is connected with the testing input $p$ by way of resistor R1 and over the rectifier G3 with the coupling input $k1$, its output being directly connected with the marking output $z$ and over rectifier G2 with the coupling output $k2$, the coupling input and coupling output being connected by rectifier G1. The cathodes of the respective rectifiers are on the coupling input $k1$ and the anodes on the coupling output $k2$. The inverter J is operatively controlled jointly by the potentials extended to the testing input $p$ and to the coupling input $k1$. The idle potential and the release potential are positive and the marking potential is negative.

When the coupling input $k1$ receives the positive release potential and the testing input the positive idle potential, the input of the inverter J will receive positive potential and will transmit its negative output potential to the marking output $z$, to act as marking potential, and will also transmit such negative potential by way of rectifier G2 to the coupling output $k2$ to act as blocking potential, rectifier G1 preventing equalizaiton of the potentials on the coupling input and coupling output.

When the coupling input $k1$ receives the negative release potential and the testing input $p$ the negative busy potential, the input of the inverter J will receive negative potential, because the release potential is blocked by the rectifier G3. The positive output potential of the inverter J appears on the marking output $z$ as a neutral potential and over the blocking rectifier G2 at the coupling output $k2$. The release potential remains without effect, being required only for blocking the rectifier G3 of the succeeding stage.

When the coupling input $k1$ receives the negative blocking potential, the input of the inverter J will always receive negative potential because a positive potential that may have been extended to the testing input $p$ will break down at the resistor R1 due to the pass action of the rectifier G3. The positive output potential of the inverter J appears as a neutral potential at the marking output $z$. The blocking action of the rectifier G2 keeps such potential away from the coupling output $k2$ which receives over the rectifier G1 the negative potential of the coupling input $k1$, to act as blocking potential.

A different arrangement may again be produced by the provision of differently polarized rectifiers, such arrangement to be used when negative idle potential is available and positive marking potential required. The release potential will in such case be positive.

FIG. 9 shows a switching stage in which the marking output $z$ is connected with the testing input $p$ by way of resistor R1, also to the coupling input by way of rectifier G3, and further, directly to the input of the inverter J. The inverter output is connected with the coupling output by way of rectifier G2 and the latter is connected with the coupling input $k1$ by way of the rectifier G1. The cathodes of the respective rectifiers are on the coupling input k1 and the anodes on the coupling output k2. This arrangement is similar to FIG. 8 except for the connection of the marking output z. The inverter is operatively controlled by potential appearing at the marking output z. The idle potential, release potential and marking potential are positive.

When the coupling input k1 receives the positive release potential and the testing input p the positive idle potential, the series circuit comprising the resistor R1 and rectifier G3 will be between two points with identical potential; this positive potential appears at the same time at the marking output z, to act as a marking potential, and at the input of the inverter J, to act as control potential. The negative output potential of the inverter is extended as a blocking potential to the coupling output k2 by way of the rectifier G2, rectifier G1 preventing equalization of the potentials on the coupling input and coupling output.

When the coupling input k1 receives the positive release potential and the testing input p the negative busy potential, the marking output z, due to the blocking of the release potential by the rectifier G3, will receive the negative potential at the testing input p, to act as a neutral potential which also controls the inverter. The positive output potential of the inverter is extended as a release potential to the coupling output k2, over rectifier G2, to act merely for the blocking of rectifier G3 in the succeeding stage.

When the coupling input k1 receives the negative potential, the marking output z will always receive neutral potential because idle potential that may have been extended to the testing input p will break down due to the resistor R1 and due to the pass action of rectifier G3. The positive output potential of the inverter J will not become effective at the coupling output k2 due to the blocking action of the rectifier G2, the latter receiving over the rectifier G1 the negative potential of the coupling input k1, to act as a blocking potential.

This circuit may likewise be modified by different polarization of the rectifiers, to provide an arrangement that may be used when the idle potential and the marking potential are to be positive. The release potential will in such a case be negative.

Explanations will now be rendered which apply to all the differently constructed switching stages, to show that it will be possible to provide from case to case advantageous modifications.

Each embodiment comprises a resistor R1 having the function, in cooperation with a rectifier connected therewith, to reduce a potential when the rectifier is open on the side facing away from the resistor. The resistance of this resistor R1 is relatively high in order to accomplish in the absence of other requirements as complete a reduction of the potential as possible. When the potential extended to the rectifier assumes a value causing blocking of the rectifier, a voltage division will be effected, the relative amount of which will be determined by the blocking impedance of the rectifier and the resistance of the resistor R1. If this resistance is dimensioned very high, as is desirable, low requirements will be put on the rectifier, and at the connecting point between resistor and rectifier there will occur a potential increase which might in some circumstances be troublesome and place a limit on the resistance value of resistor R1. A remedy against this and therewith freedom in the dimensioning resides in connecting a rectifier and a resistor in parallel, and polarizing the parallel circuit so that it is connected with identical poles to the rectifier that is already present. The additional rectifier represents a low resistance shunt for the undesired potential increase and thus suppresses its appearance. The operation of the arrangement is otherwise unaffected.

It has been mentioned before that it is important to prevent delivery of a marking potential prior to delivery of the blocking potential. This requirement is for all embodiments fulfilled when using inertia-free inverters, that is, inverters provided with transistors or high-vacuum tubes. The use of elements energizing with some delay, however small, such as gas discharge tubes, in an inverter, may, however, violate this requirement in structures according to FIGS. 3, 4 and 9. If such elements are used, in the corresponding structures, means must be provided for effecting the delay in the delivery of the marking potential, which assure the required timing sequence. This delay is basically also required in the remaining embodiments, always when it is necessary to avoid disturbing influences caused by devices that become subsequently idle. The delay may be obtained in simplest manner by capacitive loading of the marking output z which slows the transition from the neutral to the marking potential.

The embodiments according to FIGS. 5 and 6 may represent exceptions. The use of inverters, in these embodiments, which exhibit a certain exciting interval will furnish the desired delay without requiring auxiliary means.

Transstors are particularly adapted for use as polarity changing elements in the inverters, because only very small differences will appear between the means value of the input potentials and the mean value of the output potentials. Transistors also give a choice between npn and pnp types, thus providing best conditions for meeting the desired requirements.

In the case of selection circuits with relatively many stages, known staggering may be used for the chain circuit formed of the rectifiers G1, such staggering giving the advantage of providing for desired effective distances always only one freely and therefore small selectable number of serially connected rectifiers. This rectifier staggering may also be employed in the case of selection circuits with arbitrarily fixable zero point, insofar as auxiliary contacts actuated in the staggered circuit in common with the respective contacts t, will upon opening of a contact t interrupt all connections of the switching stages associated with such contact and leading to preceding switching stages.

As has been said before, in a selection circuit with fixed zero point, as in case of FIG. 1, simplifications may be carried out with respect to the first and the last stage, provided that no limitations are posed for different purposes, as will presently be explained. The simplifications may generally provide for omission of elements connected respectively to the coupling input k1 of the first stage and to the coupling output of the last stage.

Embodiments will now be described with reference to FIGS. 10 to 12 in which transistors are used for effecting the at least approximate potential identity between coupling output and coupling input so as to fulfill the previously noted third criterion. The transistor acts thereby as inverter; the symbolic representation of the inverter having been omitted because a certain insertion of the transistor and utilization of its properties permits, as compared with the examples so far described, to omit further switching means such, for example, as rectifiers.

Figure 10:
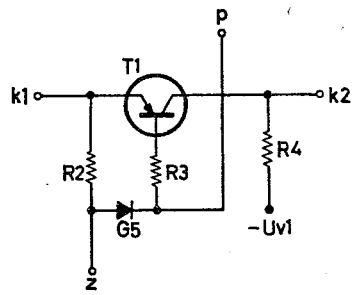

FIG. 10 shows a switching stage in which the coupling input k1 is directly connected with the emitter of a transistor T1; the marking output z being connected by way of a resistor R2; the base of the transistor being connected with the testing input p over a resistor R3 and connecting with the marking output z over a rectifier G5; the coupling output k2 being directly connected with the collector of the transistor T1 and over a resistor R4 with a voltage source $Uv1$ having a potential which is approximately equal to the neutral potential of the marking output z.

In FIG. 10, there is used a pnp transistor, the rectifier is poled so that its anode is connected to the marking output z. Idle potential, release potential and marking potential are positive and busy potential, blocking potential and neutral potential are, accordingly, negative.

When the testing input $p$ receives positive idle potential and the coupling input $k1$ positive release potential, positive potential will also be at the connecting point of the resistor R2 and rectifier G5, thus supplying positive marking potential to the marking output $z$. Since the emitter and the base of the transistor T1 are on the same potential, no current will flow over the transistor, the negative potential delivered over the resistor R4 to the collector, from the current source Uv1, will remain unaffected, and negative blocking potential will accordingly appear at the coupling output $k2$.

When the testing input $p$ receives negative busy potential and the coupling input $k1$ positive release potential, the connecting point of resistor R2 and rectifier G5 will receive the negative potential of the testing input $p$, because the positive potential at the coupling input $k1$ will be practically ineffective due to the effect of the resistance value of resistor R2 which is relatively high as compared with the pass impedance of rectifier G5. The marking output $z$ therefore receives the negative neutral potential. The transistor is blocked by the potential conducted to its emitter and to its base, the collector thus receiving a positive potential which is due to transistor properties only slightly lower than that on the coupling input $k1$. The coupling output $k2$ therefore receives positive release potential.

Negative blocking potential conducted to the coupling input $k1$ will appear by way of resistor R2 as neutral potential on the marking output $z$ since a positive idle potential which may have been connected to the testing input $p$ will remain ineffective with respect to the marking output $z$ due to the blocking action of rectifier G5. Since the negative potential of the emitter blocks the transistor T1, even when negative busy potential is conducted to its base from the testing input $p$, no transistor current will flow. The negative potential from the source Uv1, connected to the collector over resistor R4 therefore remains unaffected and negative blocking potential will appear on the coupling output $k2$.

In case such a switching stage is to cooperate with devices delivering negative idle potential and requiring negative marking potential, an npn transistor will be used and the rectifier G5 will be oppositely poled.

In accordance with the previously rendered explanations according to which the potential of the pole of the voltage source Uv1 which is connected with the resistor R4 is equal to the neutral potential of the marking output $z$, in this case, positive potential will have to be conducted to resistor R4. The blocking potential is for this reason likewise positive. The operation of such a switching stage, considering of course changed polarities, corresponds entirely to that of the described switching stage.

The previously mentioned feature of suppressing the slight potential increase occurring upon extension of idle potential and blocking potential at the marking output in the presence of low blocking impedance of the rectifier G5, is in the above described structures remedied by connecting in parallel to the resistor R2 an auxiliary rectifier which is connected with the rectifier G5 with identical poles lying on the marking output $z$.

Double seizure may in such embodiment be prevented by delaying either the extension of the idle potential or the delivery of the marking potential.

Upon interconnecting the switching stages of FIG. 9 to provide an electronic selection circuit according to FIGS. 1 or 2, positive potential is conducted to the coupling input $k1$ of the first stage, to place the circuit in operation, such potential corresponding to the release potential extended to the coupling input $k1$ of a succeeding stage. When this potential, acting as an output potential of a storage circuit, can assume the positive value corresponding to the release potential as well as the negative value corresponding to the blocking potential, it may serve for operatively connecting and disconnecting the selection circuit.

Two embodiments of switching stages will now be described comprising a transistor for delivering the blocking potential for the coupling output $k2$, as in FIG. 10, and a further transistor for delivering the marking potential to the marking output $z$. Since the marking potential is in these embodiments relatively high, the corresponding switching stages may very well be used, for example, for controlling the operation of relays.

Figure 11:
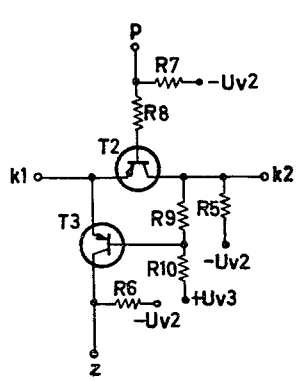

FIG. 11 shows a switching stage comprising two transistors of the same conduction type, in this case pnp transistors. The emitters of both transistors are connected to the coupling input $k1$. The collector of the transistor T2 is connected to the coupling output $k2$ and the collector of transistor T3 is connected with the marking output $z$. The outputs $k2$ and $z$ are connected to the negative pole of a voltage source Uv2, respectively by way of resistors R6 and R5, such voltage source being also connected to the testing input $p$ over resistor R7, the testing input being connected with the base of the transistor T2 by way of the resistor R8. The base electrode of the transistor T3 is connected with the coupling output $k2$ by way of a resistor R9 and to the positive pole of a voltage source +Uv3 by way of a resistor R10, the potential of the positive pole of this voltage source being such that the potential of the base electrode of transistor T3, determined with blocked transistors T2 and T3 by the voltage sources Uv2 and Uv3 and by the resistors R5, R9 and R10, referrred to the release potential extended to the coupling input $k1$, has a lower negative value. The remaining potential values will become apparent from the explanations of the operations to be rendered in the following discussion. The idle potential, release potential and marking potential have positive values and, therefore, the busy potential, blocking potential and neutral potential will have negative values.

When positive idle potential is extended to the testing input $p$ and positive release potential to the coupling input $k1$, the transistor T2 will be blocked, since the negative potential conducted over resistor R7 to the base electrode is made ineffective by the idle potential. The coupling output $k2$ carries as a blocking potential negative potential determined essentially by the voltage source Uv2 connected by way of resistor R5. The base electrode of the transistor T3 has, as previously explained, a low negative potential, referred to the release potential connected to the coupling input $k1$, whereby the transistor T3 is made conductive. The marking output $z$ accordingly receives positive potential as a marking potential, which is lower than the release potential by only a very small amount determined by the transistor properties.

When negative busy potential is extended to the testing input $p$ and positive release potential to the coupling input $k1$, the transistor T2 will become conductive, with its collector potential only negligibly lower than its emitter potential. The coupling output $k2$ will receive positive release potential because, due to the resistor R5, the voltage source Uv2 connected to the coupling output $k2$, cannot exert any effective influence. This positive potential is conducted to the base electrode of the transistor T3 by way of resistor R9, whereby the potential-reducing effect of the voltage divider comprising the resistors R9 and R10 is equalized by the positive bias by means of the voltage source Uv3 to such an extent, that the potential of the base electrode of the transistor T3 is at least equal to the emitter potential, that is, equal to the release potential. The transistor T3 is thereby blocked and at the marking output $z$ will be the negative potential of the voltage source Uv2, connected thereto by way of the resistor R6, which will act as a neutral potential.

When the negative blocking potential is conducted to the coupling input $k1$, neither the transistor T2 nor the transistor T3 can become conductive, regardless whether there is idle or busy potential on the testing input $p$, because positive emitter potential is always required for the current flow in the two transistors. The coupling output $k2$ and the marking output $z$ accordingly carry negative potential, determined by the voltage source $Uv2$ and connected respectively by way of resistors R5 and R6, such potential serving respectively as a blocking potential and as a neutral potential.

Figure 12:
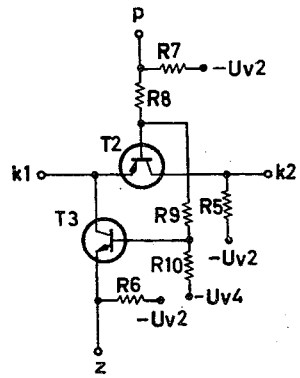

FIG. 12 shows a switching stage equipped with two transistors of different conduction type, that is, with a pnp and an npn transistor. The pnp transistor T2 has its emitter connected to the coupling input $k1$ and its collector to the coupling output $k2$ and its base electrode connected to the testing input $p$ by way of the resistor R8. The npn transistor T3 has its emitter and collector respectively connected to the marking output $z$ and the coupling input $k1$. The base electrode of this transistor T3 is connected by way of a resistor R9 to the base electrode of the other transistor T2 and over a resistor R10 to a pole of a voltage source $Uv4$ whose potential is such that, with blocked transistors T2 and T3, the potential determined by the voltage sources $Uv2$ and $Uv4$ and by the resistors R7, R8, R9, R10, of the base electrode of the transistor T3, referred to the emitter potential determined by the voltage source $Uv2$, will have a lower negative value. At the testing input $p$, coupling output $k2$ and marking output $z$, there is connected the negative pole of a voltage source $Uv2$, respectively by way of resistors R7, R5 and R6. The remaining potential values will become apparent from the description of the operation of this switching stage which is to follow. The idle potential, release potential and the marking potential have positive values and, accordingly, the busy potential, the blocking potential and the neutral potential will have negative values.

When positive idle potential is extended to the testing input $p$ and positive release potential to the coupling input $k1$, the transistor T2 will be blocked, since the negative potential conducted to its base electrode is made ineffective by the idle potential conducted to the base electrode by way of resistor R7. The coupling output $k2$ therefore carries as a blocking potential the negative potential determined by the voltage source $Uv2$ which is connected by way of resistor R5. The base electrode of the transistor T3 receives a potential which is determined by the positive idle potential and the negative bias $-Uv4$ in a ratio of the corresponding resistors, referred to emitter potential determined by the voltage source $Uv1$, and which is slightly positive. The transistor T3 is thus made conductive and the marking output $z$ receives the positive marking potential which is only negligibly lower than the release potential.

When the testing input $p$ receives negative busy potential and the coupling input $k1$ positive release potential, the transistor T2 will become conductive, with its collector potential only slightly lower than its emitter potential. Since the resistor R5 practically prevents exerting any influence of the voltage source $Uv2$ connected to the coupling output $k2$, the coupling output $k2$ will receive the positive release potential. The base electrode of the transistor T3 has, as previously explained, a low negative potential as compared with the potential of the emitter, and the transistor T3 is thereby blocked. At the marking output $z$ will be the negative neutral potential of the voltage source $Uv2$ connected by way of the resistor R6.

When the coupling input $k1$ receives negative blocking potential, neither transistor T2 nor transistor T3 will pass current because, in the case of transistor T2, the positive emitter potential is lacking and, in the case of transistor T3, identical potential is on the emitter and on the collector. The coupling output $k2$ and the marking output $z$ will accordingly have negative potential, serving respectively as blocking potential and as neutral potential, which is supplied by the voltage source $Uv2$ and respectively connected by way of resistor R5 and R6. A weak current will flow over the base electrode of the transistor T3 to the emitter, incident to connecting the positive idle potential to the testing input $p$, producing by way of resistor R6 a slight potential increase at the marking output $z$, but such potential increase is too weak to act as a marking potential.

The two above described switching stages meet the requirements of the previously defined three criteria even in a case in which a device is marked as being busy merely by disconnecting the positive idle potential without connecting the negative busy potential, the testing input $p$ remaining in such a case without defined potential. Accordingly, if desired for some reason, the connection of the testing input $p$ to the negative pole of the voltage source $Uv2$, by way of resistor R7, may be omitted. The operation of these two stages and also of the stage according to FIG. 10 remains in similar manner unaltered if extension of negative blocking potential to the coupling input $k1$ is omitted, leaving such coupling input free of potential. Since the potential of the negative pole of the voltage source $Uv1$ and $Uv2$, respectively, connected to the coupling output $k2$ respectively by way of resistors R4 and R5, serves in FIGS. 10, 11 and 12 as blocking potential for a respectively successive stage, such connection of the source to the coupling output $k2$ may be omitted in FIGS. 10 and 12 unless retention thereof should be desirable in view of other requirements to be met in the succeeding stage. However, such connection of the voltage source $Uv2$ cannot be omitted in FIG. 11 because its presence is required for the potential conditions on the base electrode of the transistor T3.

It has been mentioned in connection with the description of FIGS. 1 and 2 that it is important to prevent in each switching stage delivery of the marking potential to the device of the respective stage prior to delivery of the blocking potential to the succeeding stage. It has also been mentioned that the simplest means for satisfying the corresponding timing requirement resides in the provision of a capacitive loading of the marking output which operates to delay delivery of the marking potential, thereby also delaying the transition from the delivered marking potential to the neutral potential unless such transition delay is guarded against by special means provided in the selection circuit. A renewed operative utilization of the selection circuit is, however, admissible only after a sufficient interval following the marking potential, so as to avoid double seizures. This behavior does not produce noticeable drawbacks so long as the delays are very slight; it may, however, produce disadvantages when the delay necessarily assumes a relatively great value. Such a case arises, for example, when the signal for releasing the marking operation is given by a contact, requiring a long interval in comparison to the operation of electronic elements.

The examples of the invention which will be described in the following avoid the disadvantage attending the delay incident to the delivery of the marking potential while preserving all other features. The means for obtaining the desired result resides in the provision of a storage device, in each switching stage, which effects timed release and assumes operating position responsive to connection of at least the idle potential on the testing input, and having, moreover, means for blocking the appearance of the marking potential at the marking output until completion of release of the storage device. Switching stages constructed in this manner give complete security against double seizures and are after termination of the marking operation again instantly ready for operation.

The storage device may be inserted in the various embodiments of switching stages, in simplest manner, ahead of the respective testing input. The device belonging to the respective switching stage transmits to the storage device the potential characteristic of its momentary condition, that is, idle or busy potential, and the output potential from the storage device is placed on the testing input of the corresponding switching stage which is otherwise structurally unaltered. The potential conditions of the switching stage as described before are preserved unless the storage device acts also as inverter in which case the values of the idle and busy potentials are exchanged while the remaining potentials remain the same. Particularly suitable for the purpose in view are primarily storage devices comprising an element that may assume two stable conditions, for example, a gas discharge tube or point transistors or double base diodes.

However, for various reasons, a bistable flip-flop circuit will be given preference, usually containing two similar elements and in which the two stable conditions are maintained by means of a feedback. The best known device of this kind is the bistable multivibrator comprising two high-vacuum tubes or transistors, one such element being always blocked while the other is conductive. An essentially similar operation is also present in case of known flip-flop circuits comprising two gas discharge tubes, preferably with cold cathodes.

Such bistable flip-flop circuits may be provided for co-operation with the switching stages, as described before, that is, it may be connected ahead of the testing inputs of the respective stages. Particularly characteristic features of the multivibrator permit, however, reduction of expenditures, as compared with flip-flop circuits, because the multivibrator can operate as a storage device and also as an inverter. The multivibrator is for this purpose to be included in the switching stages.

The following description will explain, with reference to various embodiments, how such multivibrators are to be included in the switching stages and, insofar as necessary, also a favorable control circuit serving for the storing and for the delivery of the marking potential.

The figures to which the following description will refer are limited to illustrate the control stage and the first selection circuit fixedly connected thereto, which therefore has a marking sequence starting from a fixed zero point. In order to provide for operation with advancement of the zero point incident to each marking operation, the switching stages are to be interconnected in a loop circuit according to FIG. 2, and the required contacts are to be formed as switch-over contacts, each contact, in its operated position, effecting interruption of the loop and connection of the successive switching stage to the control circuit. The number of switching stages that may be provided to form the selection circuit is not limited within the usual requirements of signalling systems.

The embodiments to be described comprise flip-flop circuits operating as storage means and control stages containing high-vacuum tubes. It is, however, possible to employ transistors by making changes such as are to be made when substituting transistors for high-vacuum tubes.

Figure 13:
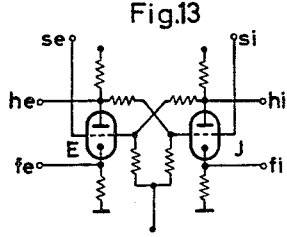
FIG. 13 illustrates a storage arrangement for use in switching stages.

FIG. 13 shows in somewhat simplified manner a broadly known, bistable flip-flop circuit comprising the portions E and J. The control grid of each tube provided with a plate resistor is connected in direct current feedback, by way of a resistor, with the plate of the other tube and the control grids of both tubes are biased by way of resistors so that one tube is at cut-off when the other tube is conductive and therefore has reduced plate potential, such tube being held conductive when the other tube is blocked and therefore has high plate potential. The flipping of such a bistable circuit is effected by conducting thereto suitable impulses, in such a manner that, depending upon the polarity of such impulses and the point at which they occur, either the conductive tube is cut off or the blocked tube is caused to become conductive. In the circuit according to FIG. 13, the impulses are respectively conducted to the inputs *se* and *si* which are connected with the control grids. The circuit accordingly will flip responsive to a negative impulse conducted to the conductive tube or responsive to a positive impulse with sufficient amplitude which is conducted to the blocked or cut-off tube. The outputs of the circuit are indicated at *he* and *hi* which are connected to the plates of the respective tubes. In the case of pentodes, the operation may be such that the plates act as reaction-free decoupling electrodes while the screen grids of both tubes are operated in the manner of auxiliary plates. Provision of cathode resistors will permit utilization of further outlets *fe* and *fi*. The flip-flop circuit, inserted in a switching stage, will operate as a storage device and as an inverter. While the two stable operating positions provide for the storing, rules concerning the potenential conditions at the inputs and outputs are important for the additional use of the circuit as an inverter.

Considered from a predetermined input, there will occur, responsive to a change of the input potential, a similar potential change at the output on the cathode side of the corresponding tube and at the output on the anode side of the other tube, while the potential changes occurring on the two remaining outputs, namely, on the anode side of the corresponding tube and the cathode side of the other tube, will be oppositely oriented. It follows, therefore, that the potentials of the two outputs on the anode side as well as of the two outputs on the cathode side, will always in different direction vary from a mean value of the respective plate and cathode potentials and that such potentials are, accordingly, complementary. The application of this general rule to the flip-flop circuit in FIG. 13 shows that such circuit will operate as an inverter, responsive to connecting a potential, for example, to the input *si*, when the output potential is taken either from the output *hi* or from the output *fe*; this effect does, however, not occur upon using the outputs *he* or *fi*. Due to the symmetry of the circuit, these explanations also apply to the second input *se*. One of the tubes with its respectively associated switching elements therefore can always be considered in the nature of an inverter J while the other tube with its respectively associated switching elements forms a partial arrangement which supplements the inverter J to form a bistable flip-flop circuit, this other tube which may be referred to as supplementer being indicated at E.

The potentials of the two outputs *he* and *hi* on the anode sides, just as the potentials of the two outputs on the cathode sides, lie always on both sides of a common mean or average value; the potential mean value of the outlets *he* and *hi* being, however, considerably higher than that on the outlets *fe* and *fi*, since one output *f* has either the potential of the negative pole of the operating current source or the increased cathode potential of the conducting tube, while the two values on the outputs *h* correspond to the decreased plate potential of the conducting tube and the potential of the positive pole of the current source. The outputs *h* have, accordingly, a certain basic potential which is not present in case of the outputs *f*. As will presently be explained, the provision of two pairs of outputs with different mean potential values results in adaptability of the flip-flop circuit to the most varied requirements. Either the tube of the inverter J or the tube of the supplementer E may be conducting in the normal position of the flip-flop circuit. Just which of the two conditions may serve for defining the normal position of the flip-flop circuit depends essentially upon the polarity of the impulse employed for effecting flipping.

Various embodiments will now be described to give examples of the manner of inserting flip-flop circuits to act as storage means in previously described switching stages. Structures shall thereby be considered in which solely the potential conducted to the testing input is employed for controlling the inverter. The switching stages as such, of both groups, remain for the most part unchanged.

Figure 14:
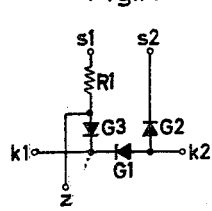
FIG. 14 is a partial view of an arrangement according to FIG. 3, for use in connection with a storage circuit.

FIG. 14 shows the part of a switching stage required for establishing connection with a bistable flip-flop circuit serving as storage means. This part, which is, as compared with switching stages comprising simple inverters according to FIGS. 3 to 6, unchanged, forming the basic circuit for a series of different switching stages, has its marking output $z$ connected to the coupling input $k1$, by way of a rectifier G3, being also connected to the feed input $s1$, by way of resistor R1, and has its coupling output $k2$ connected to the coupling input $k1$ by way of rectifier G1, the coupling output $k2$ being also connected to a control input $s2$. The rectifiers are in this embodiment polarized so that the cathodes lie on the coupling input $k1$ while the plates lie on the coupling output $k2$. With such poling of the rectifiers, as previously explained in detail, the idle potential and the release potential, referred to the mean or average values to be respectively derived from the idle and busy potentials and the release and the blocking potentials, must be positive, thus making the marking potential likewise positive.

In accordance with explanations rendered before, this basic circuit, to form a complete switching stage according to FIG. 3, must be connected so that the feed input $s1$ serves as a testing input $p$ while the control input $s2$ is connected with the output of the inverter, the input of which is connected to the feed input $s1$. The storage device is to be connected accordingly, observing the conditions noted below.

The feed input $s1$ must not be used as testing input but must be connected to a storage output because $s1$ extends by way of resistor R1 to the marking output $z$ which would otherwise be affected by the potential changes at the testing input. The control input $s2$ must be connected to a storage output at which the potential changes are opposite to those occurring at the storage output which is connected to the feed input $s1$. In view of the fact that only potential differences will always be effective and evaluated, the feed input $s1$ and the control input $s2$ must be connected to storage outputs having the same average potential value. Moreover, the requirement must be observed according to which neutral potential is conducted to the marking output $z$ in the normal position of the storage means. There rules apply to the basic circuit shown in FIG. 14 as well as to another basic circuit to be presently described, such other circuit being structurally similar but having oppositely poled rectifiers.

Figure 15:
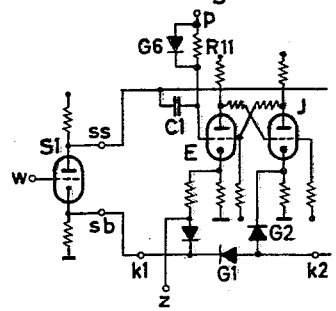
FIGS. 15 and 16 show features of the switching stage according to FIG. 3 and the respectively associated control stages.

FIG. 15 shows a switching stage utilizing, in accordance with the above noted rules, the basic circuit of FIG. 14 interconnected with a storage device EJ shown in FIG. 13 and a control circuit which is suitable for a selection circuit constructed of such switching stages. The storage means EJ is interconnected with the basic circuit by connecting the feed input $s1$ and the control input $s2$ respectively with supplementer output $fe$ and the inverter output $fi$. The testing input $p$ is connected to the supplementer input $se$ by way of resistor R11 in parallel circuit with rectifier G6, the plate of the rectifier G6 lying on the testing input $p$. The control stage S1 comprises a high-vacuum tube having a cathode resistor, the plate of the tube being connected to a storage control output $ss$ and the cathode being connected to a marking control output $sb$, while the control grid is connected to an input $w$ over which the impulses are supplied which trigger the marking operations. For the purposes of interconnecting the control stage S1 with the selection circuit, the marking control output $sb$ is directly connected with the coupling input $k1$ of the first switching stage and the storage control output $ss$ is connected with the supplementer inputs $se$ of all storage devices, by way of respectively individual capacitors such as C1.

In the normal position, the tube of the inverter J of each switching stage will be conducting. The output $fi$ on the cathode side of the inverter J therefore will have positive potential, while the output $fe$ of the supplementer E whose tube is blocked, carries the potential of the negative pole of the operating current source, such potential accordingly, also appearing on the marking outputs $z$.

The tube of the control stage S1 is conducting and its positive cathode potential which appears on the marking control output $sb$ acts on the coupling input $k1$ of the first switching stage as a positive release potential. The coupling output $k2$ of this switching stage accordingly receives also release potential by way of the blocking impedance of the rectifiers G1 and G2. The storage control output $ss$ carries the reduced plate potential of the conducting tube of the control stage S1 which, however, due to the capacitor C1, remains ineffective so far as the operational condition of the storage device EJ is concerned. A positive idle potential that may be extended to the testing input $p$ will be of such value, referred to the average value of the idle and busy potentials, that it cannot make the tube of the supplementer E (blocked by the conducting tube of the inverter J) conductive. The potential conditions obtaining in this first switching stage also obtain in all remaining, not illustrated, stages. Accordingly, in the normal position of the selection circuit, connection of idle potential to the testing input of any desired switching stages will not cause flipping of the respectively associated storage means and therewith no connection of a positive potential to the feed input $s1$ of the basic circuit of the switching stages, thus also preventing delivery of a marking potential at a marking output $z$.

For carrying out a marking operation, a negative impulse is extended to the input $w$ of the control stage S1, such impulse placing the control tube at cut-off. A positive impulse now appears at the storage control output $ss$. The capacitance of the capacitor C1 is such that a differentiating effect is caused, producing in each switching stage, from the leading flank of the impulse appearing on the storage control output $ss$, an impulse of shorter duration, which is conducted to the supplementer input $se$. The potential values of the idle and busy potentials are such that the tubes of the supplementers E of switching stages to the testing inputs $p$ to which idle potential is extended, will become conductive due to the effect of these differentiating impulses. The storage device EJ in each of these switching stages in which the tube E is conductive will, therefore, flip into its operating position, while the corresponding inverter tube will be at cut-off. The resistor R11 in each switching stage thereby reduces the loading of the impulse by sources serving in the respective devices for delivering the idle and busy potentials; the parallel connected rectifiers G6, acting in blocking sense, remain ineffective.

In each switching stage in which the storage device EJ has flipped into operating position, the feed input $s1$ will now receive the positive cathode potential of the conducting tube of the supplementer E and the control input $s2$, due to the blocked tube of the inverter J will receive the negative potential of the operating voltage source, whereby the coupling outputs $k2$ of the corresponding stages receive blocking potential. Accordingly, as in the switching stages of FIG. 3 which are equipped with simple inverters, the marking outputs $z$ of all switching stages following the first stage provided with idle potential, will receive neutral potential. Simultaneously with the appearance of the positive impulse at the storage control output $ss$, there will appear a negative impulse at the marking control output $sb$, for the duration of which this output receives the potential of the negative pole of the operating current source. This negative impulse is on the coupling input $k1$ of the first switching stage, to which it is conducted directly, and therewith, in accordance with the previously noted criterion, at the coupling output, thus acting in all switching stages as a blocking potential and thereby also blocking in the first switching stage, whose storage device has flipped responsive to connection of the idle potential, delivery of a marking potential.

Upon termination of the negative impulse connected to the input $w$, the tube of the control stage S1 will again become conductive, whereby the storage control output $ss$ receives again the reduced plate potential. The production of negative impulses at the inputs $se$, by the differentiating action of the capacitors C1, is prevented by the rectifiers G6 acting to short circuit the resistors R11 for negative impulses. A flipping back of the storage devices into normal position, that otherwise might occur under unfavorable conditions, is thus prevented. Incident to reduction of the plate potential of the tube of the control stage S1, the cathode potential of such tube will rise again to its normal position value which is conducted over the marking control output $sb$ to the coupling input $k1$ of the first switching stage, to act as release potential. The blocking of the delivery of the marking potential is thereby in the first switching stage (with the associated storage means in operating position) removed and this stage supplies marking potential to its associated device. In the successive switching stages in which the respectively associated storage means is in operated position, the delivery of marking potential will be prevented by blocking potential extended, by the switching stage which delivers marking potential, to the next successive and therewith to all successive switching stages.

As will be apparent from the foregoing explanations, two time intervals are important for the operation of the selection circuit. During one time interval, the delivery of a marking potential is blocked or prevented in all switching stages, by blocking potential on the coupling input of the first switching stage. The duration of this blocking is determined by the duration of the impulse extended to the input $w$ of the control stage S1. During the other time interval, idle potentials extended to stages are in all such stages made effective by extending to the storage inputs, which are connected with the testing inputs $p$, impulses which effect the storing of the corresponding idle potentials. Both time intervals begin simultaneously, namely, at the instant when the input $w$ receives the leading flank of the impulse extended thereto, and this means, that a marking potential cannot appear on any of the marking outputs $z$ during the storing of the idle potentials. The blocking of the marking potential delivery is removed at an instant coinciding with the trailing flank of the impulse extended to the input $w$, and the release of the storage devices is effected coincident with the trailing flanks of the impulses respectively extended thereto. These latter impulses, which are produced by means of capacitors C1 by differentiation, from the impulses appearing at the plates and therefore indirectly from the impulses extended to the input $w$ of the control tube S, are of shorter duration than the impulse at $w$, and the release of the storage devices is therefore effected prior to the termination of blocking the delivery of the marking potential. The time interval between blocking of the storing and delivery of the marking potential may be at least equal to the flipping time of the storage devices so as to assure delivery of a marking potential only upon termination of the flipping operations initiated during the release of the storing, thus preventing suppression of the marking potential appearing on a marking output $z$, by the flipping of storage devices of preceding switching stages. For the operation of the selection circuit, this means, that idle potentials operatively extended with delays, but within the release interval of the storage devices, will be considered for the corresponding marking operation, without incurring changes in the delivery of the marking potential, which is to be avoided, while idle potentials extended to the testing inputs after release of the storage devices will not affect the marking operation, that is, will not be considered in connection therewith.

Upon completion of each marking operation, the selection circuit must be released again, that is, must be returned to normal position. The storage devices which had flipped into working or operating position during the marking operation, must flip back to normal position. This may be obtained in simplest manner by conducting over decoupling means a common impulse to those tubes of the storage devices which are during operative actuation blocked, thereby making all such blocked tubes conductive. The selection circuit assumes thereby the initial position in which marking potential cannot appear on any output $z$ despite released marking potential delivery, because the idle potentials conducted to the selection circuit, due to blocking of the storing, cannot effect operative actuation of the storage devices of the corresponding switching stages. Since there are no integrating members connected to the marking outputs in the respective switching stages, the marking potential delivered as a result of the marking operation, will upon release of the selection circuit instantly revert to neutral potential, immediately readying the selection circuit for a new operating cycle without requiring any safety measures.

Summing up, the required safety against double seizures due to different energizing times of the switching stages or due to delayed extension of an idle potential is made possible with minimum delay of the marking potential delivery and reoperation without special safety measures, by storing idle potentials extended to the selection circuit, for a limited time interval, and by blocking the marking potential delivery for the duration of the storing and a safety time interval thereafter. The storage device thereby holds the momentary condition of the devices connected to the selection circuit, which convey their momentary condition thereto in the form of idle and busy potentials, beyond the time required for the storage. This basic thought is utilized unaltered in the embodiments now to be described.

Figure 16:
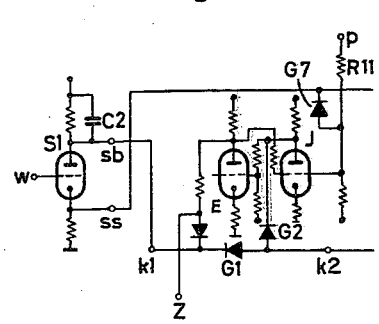

FIG. 16 shows a switching stage which combines the basic circuit according to FIG. 14 with a storage device according to FIG. 13 in a manner differing from that employed in FIG. 15, and using a control stage suitable for a selection circuit constructed of the corresponding switching stages. The switching stage according to FIG. 16 also utilizes the concepts incorporated in FIG. 3. The storage device EJ and the basic circuit are interconnected in such a manner that the feed input $s1$ and the control input $s2$, of the basic circuit, are respectively connected with the supplementer output $he$ and the inverter output $hi$ at the anode side. The testing input $p$ is carried to the inverter input $si$ by way of a resistor R11. Since the outputs $fe$ and $fi$ at the cathode side are not required, the cathode resistors may be omitted in both tubes, unless it should be desired to employ them for producing the grid bias. The control stage S1 comprises a high vacuum tube provided with plate and cathode resistors, the plate being connected to a marking control output $sb$ and the cathode to a storage control output $ss$, while the control grid is connected to the input $w$ serving for the connection of the impulse which triggers the marking operations. Parallel to the plate resistor of the tube S1 is connected a capacitor C2. For the connection of the control stage to the selection circuit, the marking control output $sb$ is connected directly to the coupling input $k1$ of the first switching stage and the storage control output $ss$ is connected by way of respectively individual rectifiers such as G7, to the inverter inputs $si$ of all storage devices, the plates of these rectifiers G7 lying in each case on the respective inverter input $si$.

In the normal position, the supplementer tube E, in each switching stage, will be conductive. The feed input $s1$ of the basic circuit and therewith also the marking output $z$, of each stage, will have the reduced plate potential of the supplementer, such potential representing in this embodiment the neutral potential, while the control input $s2$ of each basic circuit receives the high potential of the positive pole of the operating current source due to blocking of the inverter tube J. The tube S1 is in normal condition blocked. Its high plate potential acts at the coupling input $k1$ of the first switching stage as a release potential and such potential is accordingly, as release potential, also on the coupling output $k2$ of the first stage and in similar manner, by way of the rectifiers G1 and G2, on the coupling outputs of all successive stages. Positive idle potentials that may be extended to the testing inputs $p$ are of a value, referred to the mean value of idle or busy potential, such that they can cause the inverter J to become conductive. The storage control output $ss$, due to blocked tube S1 of the control stage, the potential of the negative pole of the operating current source, and the idle potentials are reduced in their amplitudes, due to the rectifiers G7 and the effect of the resistors R11 to such an extent that they remain ineffective for the storing. As in the embodiment according to FIG. 15, delivery of the marking potential is in the normal position of the selection circuit prevented.

In this embodiment, the marking potential which is determined by the potential conducted to the feed input $s1$, is the potential of the positive pole of the operating current source. It is, accordingly, considerably higher than in the structure according to FIG. 15, making it possible to use the selection circuit, for the evaluation of marking potentials, even in cases employing gas discharge tubes with cold cathodes, requiring high firing voltages. The use of arrangements exhibiting considerable attenuation, for example, various coincidence circuits, is also made possible. The connection, for obtaining the high marking potential, of the feed input $s1$ of each basic circuit to an output of the storage device on the plate side, carrying a basic potential, makes this basic potential decisive for the basic circuit of each switching stage. It must be conducted to the coupling inputs of all stages, which is achieved in the first switching stage by the galvanic connection of its coupling input to the plate of the tube of the control stage S1 and in the remaining switching stages by the connection of the control input $s2$ in the respectively preceding switching stages to the output $hi$ of the inverter J which is likewise provided with basic potential.

In order to carry out a marking operation, a positive impulse is extended to the input $w$ of the control stage S1, causing the corresponding tube to become conductive. At the storage control output $ss$ will then appear a positive impulse which will block the rectifier G7 in each switching stage and remove the amplitude decrease of an idle potential that may have been connected. The storage device EJ in each switching stage provided with an idle potential thereby flips into operating position, in which the inverter tube J is conductive, while the tube E of the supplementer is blocked. The rectifiers G7 thereby assure decoupling of the storage inputs. Since the reduced plate potential of the inverter tube J of each storage device that had been flipped into operating position, appears as blocking potential at the coupling output of the corresponding switching stage, each switching stage whose storage device has flipped into operating position, blocks in the respectively succeeding switching stage the delivery of the marking potential. In the first switching stage, with its storage device EJ in operating position, this blocking is effected by means of the control stage S1, a negative impulse appearing at the marking control output $ss$ simultaneously with a positive impulse at the marking control output $sb$, which is effective at the coupling in put $k1$ of the first switching stage and therewith, in accordance with the previously noted criterion of each switching stage, also on the coupling outputs thereof, thus serving in all switching stages as a blocking potential. This blocking, caused by the control stage, must be effected before a switching stage can deliver a marking potential responsive to flipping of its storage device; accordingly, the release potential originally extended to the coupling input $k1$ of the first switching stage must be decreased to the value of the blocking potential during the flipping time of a storage device EJ. The time constant which is controlling for this decrease is determined by the capacitance of the capacitor C2, the function of which will be presently explained more in detail, and by the resistance value of the plate resistor as well as by the internal impedance of the tube of the control stage S1. The internal impedance of this tube may be made very low, by proper control, and thus made a decisive factor for the time constant for fulfilling the posed requirement. Upon termination of the impulse conducted to the input $w$, the tube will be blocked again and the storage control output $ss$ will again assume the potential of the negative pole of the operating voltage source. The idle potentials extended to the testing inputs $p$ of the switching stages are thereby again made ineffective, without any delay, so far as the storage is concerned. Due to the blocking of the tube of the control stage, the potential of the marking control output $sb$ increases again to the potential of the positive pole of the operating current source. The time constant due to the capacitance of the capacitor C2 and the resistance value of the plate resistor of the tube of the control stage S1 is mainly decisive for this increase, since no influence of this tube occurs due to its blocking and since the first switching stage, with flipped storage device, remains without noticeable influence due to the high resistance value of the resistor R1 of its basic circuit. The delivery of the marking potential is with this delay of the transition from the blocking potential to the release potential at the marking control output $sb$ also delayed at the first switch stage with its storage device in operating position. Complete security against double seizures is for previously noted reasons provided when this delay is such that a time interval lies between blocking of the storage and the appearance of the marking potential which is at least equal to the maximum operation time of the storage device.

The release of the selection circuit after conclusion of each marking operation is effected as in the arrangement according to FIG. 15. The transition from the delivered marking potential to the neutral potential takes place without delay, so that the selection circuit is instantly ready for operation in connection with another cycle.

As mentioned before, the two above described embodiments incorporate and utilize the arrangement according to FIG. 3. The other previously described switching stages comprising a rectifier disposed between the coupling input and coupling output may be easily modified, observing the rules explained in connection with FIG. 13 concerning the insertion of a storage device in a switching stage, by incorporating therein a storage device as shown in FIG. 13 which also also serves as an inverter, and separate illustration and description of such modified switching stages is therefore omitted.

As may be seen from the foregoing explanations, a storage device flips into operating position responsive to an idle potential extended thereto, but does not return to normal position upon disappearance of the idle potential. This means, that the selection circuit, after each marking of a device, must be readied for the next successive marking operation by an impulse which is effective to restore the storage devices of all switching stages to normal position. If this is not desired, other storage devices may be used which do not require such restoration to normal position, which will now be described.

Figure 17:
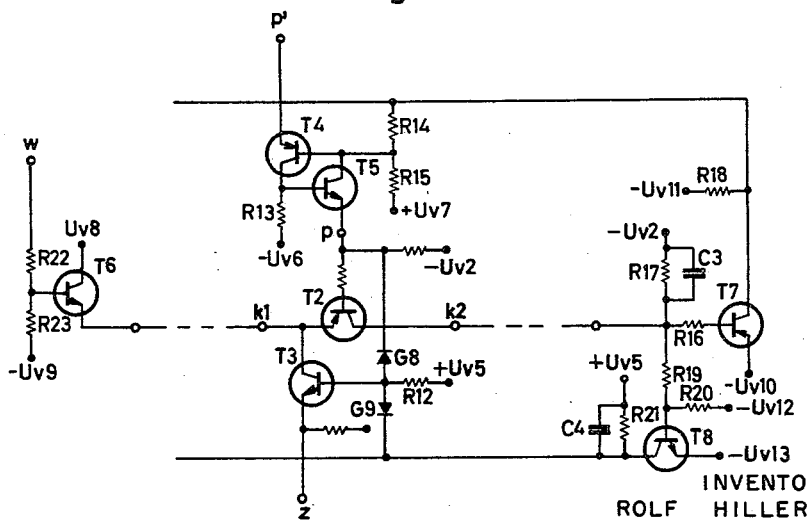
FIG. 17 represents a selection circuit with switching stages according to FIG. 12 and comprising storage means and the associated control stage as well as marking sequence starting from a fixed zero point.

FIG. 17 shows a selection circuit comprising slightly changed switching stages similar to FIG. 12, modified by storage devices inserted therein. There may be any desired and suitable number of such modified structurally identical switching stages, FIG. 17 showing only one such stage together with the required control means. A fixed zero point may be provided for the selection circuit by directly connecting the coupling input $k1$ of each switching stage (except the first stage) with the coupling output $k2$ of the respectively preceding stage. The changes required for obtaining, if desired, a shifting of the zero point incident to each marking attempt will be discussed later.

The switching stage shown in FIG. 17 is provided with transistors T2 and T3, as in FIG. 12, and its inputs are similarly marked by $p$, $k1$, $k2$ and $z$ but, as already mentioned in the explanations concerning FIG. 12, the connection of the coupling output $k2$ to the voltage source $Uv2$ by way of a resistor R5, is omitted. The connection of the base electrode of the transistor T3 has also been changed, such connection extending by way of rectifier G8 to the testing input $p$ and by way of resistor R12 to a pole of the voltage source $Uv5$ having a potential which is slightly positive as referred to the positive release potential conducted to the coupling input $k1$. The rectifier will pass current so long as negative busy potential is extended to the testing input $p$, whereby the base electrode of transistor T3 is held approximately at the value of the busy potential, such transistor being thereby in blocking condition independent of its momentary collector potential. However, when idle potential is extended to the testing input $p$, the rectifier G8 will be blocked and the positive potential of the voltage source $Uv5$ will affect the base electrode of the transistor T2. This transistor will now pass current responsive to extension of idle potential to the collector. It will be seen, therefore, that this modified circuit fulfills the previously defined three criteria, just as they are fulfilled in the case of FIG. 12.

The storage device, which is broadly known and which is provided in each switching stage, comprises pnp transistor T4 and npn transistor T5, the base electrode and collector of the transistor T5 being directly connected respectively with the collector and base electrode of the transistor T4. The emitter of the transistor T4 is connected with the testing input $p'$; the emitter of the transistor T5, forming the output of the storage device, being connected with the testing input $p$ of the basic switching stage, thereby receives negative potential from the voltage sources $Uv2$. The base electrode of transistor T5 receives by way of resistor R13 a potential from the voltage source $Uv6$ which is at least equal to the potential connected to the collector and of the same polarity. The base electrode of the transistor T4 receives by way of resistors R14 and R15 a potential which is in part determined by the voltage source $+Uv7$, which potential can assume two different values. One of these values, referred to as "positive" is at least equal to the idle potential that may be extended to the testing input $p'$ and of the same polarity and, therefore, prevents operative actuation of the transistor T4 responsive to the appearance of an idle potential. The other value, referred to as "negative" effects operative actuation of the transistor T4 responsive to the appearance of the idle potential on the testing input $p'$ which is, however, prevented responsive to appearance of the busy potential. The emitter and the base electrode of the transistor T4 therefore are to be considered as the two control inputs of the storage device.

When current flows in the transistor T4, its collector will receive about the potential of the emitter, the transistor will likewise become conductive, its collector will assume about the potential of its emitter thereby securing the current flow in the transistor T4, until an equilibrium condition results, which is determined by the transistor characteristics as well as the resistors and the potentials supplied. Due to this feedback, which imparts a falling characteristic to the combination of the two transistors, the two control inputs of the storage device can effect different control, such, that the two transistors become conductive, causing flipping of the storage device responsive to idle potential conducted to the testing input $p'$, only if negative potential is extended to the second control input, the storage device once flipped remaining in its flipped position and not flipping back incident to the transition of the potential conducted to the second control input from its negative to the positive value, flipping back being possible only responsive to busy potential replacing the idle potential conducted to the testing input $p'$ or responsive to disconnection of idle potential from the testing input $p'$. These particular control features provide for an operation which, among others, eliminates separate means for effecting restoration.

There are provided, common to all switching stages, a starting stage connected ahead of the coupling input $k1$ of the first switching stage and a blocking stage connected following the coupling output $k2$ of the last stage.

The starting stage comprises an npn transistor T6 with its collector connected directly to a voltage source $Uv8$, the collector potential determined by this source having a value corresponding to that required by a switching stage as a release potential. The base electrode of the transistor T6 is connected to a voltage source $Uv9$ by way of resistor R23 and to the input $w$ by way of resistor R22. The input $w$ receives the signals which effect the triggering of the marking operations. The voltage source $Uv9$ and the resistors R22 and R23 are dimensioned so that transistor T6 can become conductive only responsive to the appearance of the triggering signal at the input $w$. The coupling input $k1$ of the first switching stage is connected to the emitter of the transistor T6.

The blocking stage comprises a pnp transistor T7 and an npn transistor T8. The base electrode of transistor T7 is connected to the coupling output $k2$ of the last stage by way of a resistor R16. This coupling output $k2$ is capacitively loaded by means of a capacitor C3 and is extended by way of a resistor R17 to the voltage source $-Uv2$ required for the last switching stage. The emitter of transistor T7 is directly connected to a current source $-Uv10$ and the collector, by way of resistor R18, is connected to a voltage source $-Uv11$. Moreover, the resistors such as R14, of the storage devices of all switching stages are also connected to the collector of the transistor T7. The potentials of the voltage sources $+Uv7$, $-Uv10$ and $-Uv11$ and the values of the resistances of resistors R14, R15, R18 are such that the transistor T7 will be blocked only upon extension, to its base electrode, of release potential which may appear on the coupling output $k2$, and that the base electrode of the transistor T4 in the storage device of each switching stage receives the negative potential when the transistor T7 is blocked, while receiving the positive potential when the transistor T7 is open.

Also connected to the coupling output $k2$ of the last switching stage is the base electrode of transistor T8, by way of resistor R19, such base electrode being also connected to a voltage source $-Uv12$, by way of resistor R20. The emitter of the transistor T8 is connected to a voltage source $-Uv13$ and the collector is connected by way of resistor R21 and parallel disposed capacitor C4 to a voltage source $+Uv5$ which is required for the last switching stage. To the collector of transistor T8 are connected the base electrodes of the transistors T3 of all switching stages, the respective connections extending over rectifiers such as G9 which are respectively individual to the corresponding switching stages. The emitter potential of the transistor T8 which is determined by the voltage source $-Uv13$ is approximately equal to the potential which is extended from the voltage source $-Uv2$ to the testing input $p$ of the switching stage. The potential of the base electrode of the transistor T8 which is in part determined by the voltage source $-Uv12$ is such that this transistor is blocked when the coupling output $k2$ of the last switching stage carries the negative blocking potential, and that it becomes conductive when positive release potential appears on the coupling output $k2$. It may be suitable in some circumstances, depending upon the transistor characteristics and the dimensioning of the various elements, to insert in series with each of the two parallel resistor-capacitor circuits a resistor so as to limit the capacitor discharge.

It will suffice to limit the following explanations mainly to the operation of the starting and the blocking stages and how such operations affect the switching stages.

The selection circuit will be at normal so long as there is no triggering signal on the input $w$. The transistor T6 is at such time at cut-off and there is, accordingly, no release potential on the coupling $k1$ of the first switching stage and therewith no such release potential on the respective coupling inputs $k1$ of all further switching stages. The transistor T7 is conductive due to negative potential on its base electrode, which is determined by the voltage source $Uv2$ and corresponds to the blocking potential of a switching stage. The potential of the voltage source $-Uv10$ is now effective by way of the conductor extending from the collector of T7, with respect to the resistors R14 of the storage devices of all switching stages, whereby the base electrodes of the transistors T4 of the storage devices of all switching stages, that is, the second control inputs of all storage devices receive the positive potential in accordance with the definition rendered before. The base electrode of the transistor T2 of each switching stage accordingly receives the negative busy potential. As noted, since the transistor T6 of the starting stage is blocked, all resistors T2 and T3 will be blocked, and the marking outputs $z$ of all switching stages will therefore carry neutral potential. The transistor T8 of the blocking stage is blocked by the negative potential of the voltage source $Uv2$, extended to its base electrode by way of resistors R17 and R19. Positive idle potentials extended to the testing inputs $p'$ of any of the switching stages reach the transistors T4 of the storage devices of the corresponding stages but remain ineffective due to the blocked condition of all storage devices effected by the open transistor T7 of the blocking stage.

Responsive to placing on the input $w$ a triggering signal impulse with sufficient amplitude, the base electrode of the tube T6 will receive a potential permitting current to flow in the transistor. Since the base electrodes of the transistors T2 of all switching stages receive the negative busy potential determined by the source $-Uv2$, which is due to the blocked condition of the storage devices, all transistors T2 will be conductive and pass current. Accordingly, connection of a triggering signal to the input $w$ will result in operative actuation of the transistor T6 of the starting stage and of the transistor T2 in each switching stage, causing positive release potential to appear at the coupling output $k2$ of the last switching stage. This release potential also appears on the base electrode of the transistor T7 in the blocking stage, thus blocking this transistor. Since the release potential is at the last switching stage delivered directly by the transistor T2 of such stage, the capacitor C3 is instantly oppositely charged and cannot delay the blocking of transistor T7. Due to the blocking of the transistor T7, the voltage source $-Uv11$ (instead of the voltage source $Uv10$) will affect the potential on the conductor leading to the resistors R14 of the storage devices, such resistors receiving a strong negative potential, which is effective to place the storage devices of all switching stages in readiness for operation.

The positive release potential at the last switching stage causes the transistor T8 to become conductive simultaneously with the transistor T7. The potential on the conductor leading to the rectifiers G9 of all switching stages is thus determined by the voltage source $-Uv13$, assuming a strong negative value which affects the rectifiers G9 and G8 of all switching stages in pass direction thereof. This potential alteration is effected instantaneously since the capacitor C4 is, upon actuation of the transistor T8 instantaneously oppositely charged.

The removal of the blocking of the storage devices, responsive to the blocking of the transistor T7, the storage devices of all switching stages having idle potential on the corresponding inputs $p'$, will be caused to flip, and the emitter of the transistor T5 in all such switching stages will consequently receive positive potential which corresponds substantially to the idle potential on the corresponding testing inputs $p'$. This condition effects blocking of the transistor T2 in each of the affected switching stages. The respectively associated rectifier G8 is at the same time blocked by the positive output potential of the corresponding storage device; however, rectifier G9 remains open, and the potentials determined by the voltage source $+Uv5$ cannot affect the base electrode of transistor T3, such transistor remaining blocked. The blocking of a transistor T2 of at least one switching stage effects blocking of the transistor T6 in the starting stage, due to disconnection of its emitter potential, thereby interrupting transmission by way of the transistors T2 of all switching stages, of the positive release potential delivered by the conducting transistor T5. This will result with certainty in the appearance of the negative blocking potential at the coupling output $k2$ of the last switching stage regardless of where and how often the transmission of release potential has been interrupted.

The capacitor C3 in the blocking stage, which had been charged to the value of the positive release potential cannot immediately follow this potential change on the coupling output $k2$ of the last switching stage, and discharges with a certain time constant over the parallel connected resistor R17. The potential on the base electrode of the transistor T7 thereby drops gradually and the transistor becomes again conductive, with a delay depending upon this time constant. The conductor extending from the collector of the transistor T7 to the storage devices of all switching stages is now again on the potential determined by the current source $-Uv10$ and all storage devices will accordingly be blocked. From this instant on, idle potential that may be extended to any of the testing inputs $p'$ will not cause flipping of the corresponding storage devices and will not be considered in connection with the marking operation that is in progress. The delay in effecting the blocking of the storage devices prevents premature blocking of storage devices due to opening the transistor T7 responsive to flipping of a very rapidly operating storage device while a very slowly operating storage device having idle potential connected thereto has not yet flipped, which would prevent evaluation of all idle potentials present and thus disturb the defined marking sequence. The required delay therefore must be approximately equal to the difference between the operatively effective energization times of a very rapidly flipping and a very slowly flipping storage device, such difference being so slight that it will not cause any noticeable delay in the overall operation.

The transistor T8 is blocked with practically the same delay with which the transistor T6 is opened, and the effect of the voltage source $-Uv13$ with respect to the potential on the conductor leading to the rectifiers G9 of all switching stages is thus removed. The capacitor C4 which is charged to about the potential determined by the voltage source $-Uv13$ and which discharges now with a certain time constant over the resistor R21, causes the potential on this conductor to increase with a delay to a value determined by the voltage source $+Uv5$, thus effecting blocking of the rectifiers G9 of all switching stages. The base electrode of the transistor T3, in each switching stage in which the associated storage device is in operating position, therefore having the rectifier G7 blocked, now receives the positive potential determined by the voltage source $Uv5$. The result is that the transistor T3 of the first switching stage in which the storage device is in operated position, and in some circumstances the transistors T2 of the respectively preceding switching stages, as well as the transistor T6 of the starting stage, become conductive, while the switching stage which is being considered, due to its blocked transistor T2, prevents in the respectively succeeding switching stages, in which the storage devices are operated, current flow in the corresponding transistors T3. This causes appearance of the marking potential, at the marking output z of this first switching stage in which the storage device is in operated position, with a delay which is determined by the capacitor C4. This delay is sufficient to assure that flipping operations already initiated at the time of blocking of the storage devices, and switching operations following such flipping, are concluded with certainty before a marking potential is delivered by the selection circuit. This delay and also the delay effected by the capacitor C3 prevents exchange of the marking output upon delivery of the marking potential, thereby with complete certainty preventing any possibility of doublt seizures.

The device that had been marked as a consequence of the above explained marking operation extends the negative busy potential to the testing input $p'$ of the associated switching stage, thereby causing restoration of the corresponding storage device; the base electrode of the transistor T2 of the corresponding switching stage now assumes a value permitting the transistor to become conductive.

In the selection circuit according to FIG. 17, the idle potential and the marking potential have positive values and the busy potential and neutral potential accordingly have negative values. In case the described selection circuit is to cooperate with devices which deliver negative idle potential and require negative marking potential, the circuit can easily be adapted to meet the corresponding requirements. All that is necessary is to replace all transistor with transistors of the respectively other conduction type and pole all voltage sources and rectifiers oppositely. These changes have no effect so far as the operation is concerned. If desired or required, a selection circuit constructed of switching stages according to FIG. 11 may be altered in similar manner.

The duration of the trigger signal extended to the input $w$ is such that the marking of a device is assured with certainty, such signal terminating sufficiently prior to the appearance of the busy signal from the marked device, so as to avoid double seizures.

After effecting the marking operation, the storage devices in those of the switching stages in which idle potential was present during the storage release but which had not been effected by the marking, will have remained in operated position. In case the devices can also be marked from other circuits, the storage devices of the switching stages of each such marked device will be restored to normal as soon as busy potential is conducted thereto; otherwise, the concerned storage devices will remain in their operated positions until appearance of a trigger signal for initiating the next marking operation. The brief release of the storage devices of all switching stages, responsive to a trigger signal, will result in operative actuation of the storage devices to which idle devices have extended idle potential, and such storage devices in the corresponding switching stages will, therefore, be considered incident to the next following marking operation.

The selection circuit described above has, due to fixed interconnection of its switching stages, always the same marking sequence. If it is desired to operate with a marking sequence which changes in defined manner, the serially extending chain circuit of the switching stages will have to be modified to form a closed loop, in a manner as already explained in connection with FIG. 2. The contact means for determining the marking sequence must be arranged taking into consideration the fact that the starting circuit is connected ahead of the first switching stage while the last switching stage is followed by the blocking stage.

FIG. 18 shows an arrangement in which the contact means serving for controlling the marking sequence, is also operated to effect the connection of the starting stage and of the blocking stage. The selection circuit is represented in block manner, comprising switching stages A ... N, a starting stage A$n$, and a blocking stage S$p$. Connected ahead of the coupling input $k1$ of each switching stage is a change-over or break-make contact $v1$, in the normal position of which the coupling input $k1$ is connected with the coupling output $k2$ of the respectively preceding switching stage, and the actuated position of which the corresponding switching stage is connected with the starting stage A$n$. Associated with each contact $v1$ is a contact $v2$, in the actuated position of which the coupling output $k2$ of the respectively preceding switching stage, is connected with the input of the blocking stage S$p$. The mutually respectively associated contacts $v1$ and $v2$ are always actuated in common, such that the two contacts of one single switching stage are, as indicated in the figure, in actuated position; the corresponding switching stage is thus connected with its coupling input $k1$ to the starting stage A$n$, and the respectively preceding switching stage is with its coupling output $k2$ connected to the blocking stage S$p$, while the remaining non-actuated contacts $v1$ interconnect the switching stages serially in a chain circuit.

The chain circuit extending from the transistor T6 of the starting circuit A$n$ by way of the transistors T2 of the switching stages to the transistors T7 and T8 of the blocking stage (see also FIG. 17), is interrupted for the change-over interval of the two contact pairs which are respectively actuated incident to alteration or shifting of the marking sequence, thus preventing release of the storage devices of all switching stages for the storage operation. The selection circuit is thereby blocked against receiving and evaluating idle potentials which might be extended thereto during this interval, until such a time when full operability is restored after completion of the alteration of the marking sequence.

In connection with the various modes of blocking of the marking potential delivery, as explained with reference to FIGS. 15, 16 and 17, attention may be called to another mode of blocking the marking, which may be employed in cases where the means disposed in the devices connected to the selection circuit, for the evaluation of the marking potentials, may be arranged so that they respond to potential differences. As a simple example, there may be mentioned relays having coils which do not call for any particular limitations so far as circuitry is concerned. In such a case, the delivery of the marking potential may remain unaffected, and a control potential may be extended, for the duration of the marking blocking, from the control circuit, to the poles of the evaluating means which are not connected to the marking outputs of the selection circuit, such control potential being equal to the marking potential and therefore effecting brief disappearance of the potential difference to be evaluated, the potential difference reappearing again for evaluation purposes after disconnection of the control potential. If the evaluating means are with respect to energization thereof independent of the polarity of the difference potential, as is the case with relays but not with transistors, the proper polarity has to be produced by means of rectifiers so as to prevent erroneous evaluation of the potential difference between the control potential and the neutral potential of marking outputs.

Summarizing the foregoing description of switching stages and selection circuits constructed by the use of such stages, the solution for the initially posed problem, to produce an arrangement which requires for each possible selection operation always the same time, independent of the position assumed in the sequence of devices by the device which is ultimately to be marked, may be stated to involve connection of all stages to a common connection extending throughout the entire selection circuit, said common connection being free of delay means and, accordingly, adapted to convey without delay information to other stages, thereby assuring a defined marking sequence.

For the practical use of the electronic selection circuit within the framework of a system, there are, aside from the freedom in the choice of potentials respectively extended to and delivered by the selection circuit, the most varied possibilities. For example, the potentials of the selection circuit corresponding to the momentary busy or idle conditions of the devices can be conveyed only in response to a trigger signal, while each stage of the selection circuit continuously conveys to the respectively associated device the potential of its marking output. This mode of operation, depending upon the side from which the trigger signal is given, may be compared with the operation of known call finders or preselectors, in which the switches start the selection operation only upon demand. If a selection circuit having a fixed zero point is used, its operation will correspond to that of a switch which returns to home position after each case of use. The situation is similar in the case of cyclically changed marking sequence. However, if the last marked device, in a selection circuit with arbitrarily determined zero point, is used for determining the zero point, there will be obtained an operation comparable to that of a rotary switch without return to home position. It is also possible to provide for operation such that all devices continuously convey to the selection circuit the potentials which are indicative of their busy or idle condition, and that the selection circuit designates the first idle device responsive to a trigger signal. If a selection circuit is thereby used which has a fixed zero point or a zero point which is advanced from stage to stage, the operation resulting will be comparable to that effected mainly by relay switches and by preference chains provided with a series circuit with switch-over contact. In case the last marked device should determine the zero point, the operation will approximately correspond to that of preset rotary switches. The selection circuit may also be operated in the nature of allotters or identifiers, with the object of assuring successive handling of simultaneously arriving calls. In such mode of operation, the selection circuit may remain connected to the respectively associated devices at its input and output side thereof, and may be continuously operative without requiring start of operation by a separate trigger signal.

Changes and modifications may be made within the scope and spirit of the appended claims in which is defined what is believed to be new and desired to have protected by Letters Patent.

We claim:

1. In a signalling system, a selection circuit having a plurality of switching stages, each of said switching stages having first a testing input for receiving a potential signifying idle or busy condition, second, a marking output for extending a potential signifying neutral condition or marking condition, third, a coupling input and, fourth, a coupling output for respectively receiving and extending a potential signifying release or blocking, a first gate having a first input and a second input, means for connecting said first input with said coupling input, and having an output connected with said coupling output, said first gate extending the blocking potential from said coupling input to said coupling output, a second gate of a type complementary to said first gate, said second gate being jointly controled by the potentials at said coupling input and said testing input and extending a marking potential to said marking output responsive to a release potential and an idle potential respectively extended to said coupling input and to said testing input, and an inverter cooperatively connected with said first and second gates for adapting the potential at said coupling input or said testing input for use in said first or said second gate to provide thereby a blocking potential at the second input of said first gate in response to a release potential and an idle potential extended respectively to said coupling input and to said testing input.

2. A structure and cooperation of parts according to claim 1, wherein said means respectively connected to said coupling input and to said coupling output comprises switching means adapted to pass current only in one predetermined direction.

3. A structure and cooperation of parts according to claim 2, in combination with a rectifier disposed between said coupling input and said coupling output.

4. A structure and cooperation of parts according to claim 3, in combination with an inverter controlled by the potential on said testing input for producing the potential having said complementary value.

5. A structure and cooperation of parts according to claim 3, in combination with an inverter controlled by the potential on said coupling input for producing the potential having said complementary value.

6. A structure and cooperation of parts according to claim 3, in combination with an inverter controlled jointly by the potentials obtaining respectively on said testing input and on said coupling input for producing the potential having said complementary value.

7. A structure and cooperation of parts according to claim 3, in combination with an inverter controlled by the potential obtaining on said marking output for producing the potential having such complementary value.

8. A structure and cooperation of parts according to claim 4, wherein said marking output is connected to said coupling input by way of a rectifier and to said testing input by way of a resistor, and wherein the input side of said inverter is connected to said testing input, the output side of said inverter being by way of a rectifier connected to said coupling output.

9. A structure and cooperation of parts according to claim 4, wherein said marking output is connected to said coupling input by way of a rectifier and by way of a resistor to the input side of said inverter which input side is connected to said testing input, said coupling output being connected to said testing input by way of a rectifier.

10. A structure and cooperation of parts according to claim 5, wherein the input side of said inverter is connected to said coupling input, the output side of said inverter being by way of a rectifier connected to said marking output which marking output is by way of a rectifier connected to said coupling input and by way of a resistor to said testing input, both said rectifiers being with identical poles connected to said marking output.

11. A structure and cooperation of parts according to claim 6, wherein the input side of said inverter is connected to said testing input by way of a resistor and by way of a rectifier to said coupling input, the output side of said inverter being by way of a rectifier connected to said coupling output and also being directly connected to said marking output.

12. A structure and cooperation of parts according to claim 7, wherein the input side of said inverter is directly connected with said marking output and by way of a rectifier to said coupling input and further by way of a resistor with said testing input, the output side of said inverter being connected with said coupling output by way of a rectifier.

13. A structure and cooperation of parts according to claim 11, wherein the cathodes of said rectifiers are connected to said coupling input and wherein the anodes thereof are connected to said coupling output.

14. A structure and cooperation of parts according to claim 11, wherein the anodes of said rectifiers are connected to said coupling input and wherein the cathodes thereof are connected to said coupling output.

15. A structure and cooperation of parts according to claim 2, in combination with a transistor constituting said switching means adapted to pass current only in one predetermined direction.

16. A structure and cooperation of parts according to claim 15 wherein the emitter of said transistor is directly connected with said coupling input and by way of a resistor to said marking output, the base of said transistor being connected to said testing input by way of a resistor, said marking output being connected by way of a rectifier to said coupling output which is directly connected with the collector of said transistor, said rectifier passing current responsive to extension of potential of any of said two values to said testing input.

17. A structure and cooperation of parts according to claim 11, in combination with a rectifier connected in parallel to the resistor which is connected with said marking output, one pole of such rectifier being interconnected with the functionally equivalent pole of the rectifier which is connected with said marking output.

18. A structure and cooperation of parts according to claim 15, wherein the emitter of said transistor is directly connected with said coupling input, the base of said transistor being connected to said testing input by way of a resistor, the collector of said transistor being connected directly with said coupling output, a further transistor for conducting to said marking output the marking potential, two main electrodes of said further transistor being respectively connected with said coupling input and said marking output, the base electrode of said further transistor being by way of a resistor connected with a base of said first named transistor and being also connected by way of another resistor with a bias voltage source, and said marking output being by way of a further resistor connected with a voltage source carrying a potential which is approximately equal to the neutral potential.

19. A structure and cooperation of parts according to claim 18, wherein the emitter of said further transistor is connected to said coupling input and the collector thereof with said marking output, said coupling output being by way of a resistor connected with a voltage source carrying a potential which is approximately equal to the blocking potential, the resistor connected with the base electrode of said further transistor being connected with the collector of said first named transistor, the potential of the voltage source connected to said other resistor being of a value such that the potential extended by means of said further transistor to said coupling output is of a value lying between the potential conducted to the coupling output and the value of the biasing voltage source and in the neighborhood of the latter, both transistors being of the same conduction type.

20. A structure and cooperation of parts according to claim 18, wherein the collector and emitter of said further transistor are respectively connected with said coupling input and with said marking output, the resistor connected to the base of said further transistor being also connected to the base of the first named transistor, the bias voltage source connected with said other resistor having a potential such that the potential conducted to the coupling output will lie between the release potential and the potential of the bias voltage source connected to the base electrodes of said transistors and in the neighborhood of the latter source, said transistors being of different conduction types.

21. A structure and cooperation of parts according to claim 18, wherein the collector of said further transistor is connected to said coupling input and its emitter to said marking output, the resistor connected with the base electrode of said further transistor having a polarity-depending resistance value and being also connected with the base electrode of said first named transistor, said voltage source connected to said other resistor having a potential which is approximately equal to the potential which designates a connection device to be marked as being idle, said transistors being of different conduction types.

22. A structure and cooperation of parts according to claim 18, wherein said first named transistor is a pnp transistor.

23. A structure and cooperation of parts according to claim 18, wherein said first named transistor is an npn transistor.

24. A structure and cooperation of parts according to claim 16, in combination with means for connecting to said coupling output by way of a resistor a voltage source having a potential which is approximately equal to the blocking potential.

25. A structure and cooperation of parts according to claim 1, in combination with means for capacitively loading said marking output.

26. A structure and cooperation of parts according to claim 1, in combination with an inverter for producing a potential having said complementary value, and means for altering the output potential of said inverter with a delay as compared with the alteration of the input potential thereof.

27. A structure and cooperation of parts according to claim 11, in combination with a storage device, said storage device assuming operated position responsive to potential of predetermined value appearing at said testing input and retaining said operated position for a predetermined time interval at the termination of which said storage device is released, and means for blocking appearance of marking potential on said marking output until the release of said storage device.

28. A structure and cooperation of parts according to claim 27, wherein said storage device comprises two transistors of respectively different conduction type, means for interconnecting the collector of each transistor with the base of the other transistor, voltage sources for biasing the respective transistors, means for connecting the output of said storage device with the testing input of said switching stage, and means for connecting the input of said storage device with a further testing input.

29. A structure and cooperation of parts according to claim 27, comprising a bistable flip circuit constituting said storage device, means forming at least two feed inputs for conducting to said flip circuit potentials to effect flipping thereof, means forming at least two control outputs the potentials of which are with identical average value mutually always complementary, means for connecting said marking output by way of a rectifier with said coupling input and by way of a resistor with one of said feed inputs, means for connecting said coupling output by way of a rectifier with said coupling input and by way of another rectifier with the other feed input, whereby identical poles of the respectively connected rectifiers are connected with said coupling input and said coupling output, respectively, one of said feed inputs and one of said control inputs being respectively connected to potentials of substantially identical average value, means for connecting said testing input by way of a resistor to a predetermined feed input, means for conducting to said predetermined feed input an impulse of a polarity corresponding to that of a potential connected to said testing input and designating idle condition of a device to be marked, whereby said flip circuit is flipped from its normal into its operated position, the normal position of said storage device being such that neutral potential appears on said marking output for the duration thereof.

30. A structure and cooperation of parts according to claim 1, wherein said switching stages are structurally substantially similar and are serially related, and means for connecting the coupling input of each but the first switching stage directly with the coupling output of the respectively preceding switching stage, thereby providing for a marking sequence starting from a fixed zero point.

31. A structure and cooperation of parts according to claim 1, wherein said switching stages are structurally substantially similar and are serially related, in combination with control means for arbitrarily placing the zero point for the marking sequence effected by said switching stages, said control means comprising circuit means for interconnecting the coupling input of each switching stage with the coupling output of the respectively preceding switching stage, contact means included in the respective circuit means, the last of said switching stages thereby acting as the preceding stage with respect to the first switching stage, only one of said contact means being at any operating instant open to determine the arbitrary zero point for the marking sequence to be effected.

32. A structure and cooperation of parts according to claim 30, in combination with a starting control stage carrying in normal position thereof an output potential which is substantially equal to the blocking potential, means for conducting to said starting control stage a trigger signal, said potential being for the duration of said trigger signal substantially equal to the potential which designates a device to be marked as being idle.

33. A structure and cooperation of parts according to claim 31, in combination with a starting control stage carrying in normal position thereof an output potential which is substantially equal to the blocking potential, means for conducting to said starting control stage a trigger signal, said potential being for the duration of said trigger signal substantially equal to the potential which designates a device to be marked as being idle.

34. A structure and cooperation of parts according to claim 29, wherein said switching stages are structurally substantially similar and are serially related, means for connecting the coupling input of each but the first switching stage directly with the coupling output of the respectively preceding switching stage, thereby providing for a marking sequence starting from a fixed zero point, a control stage, and means for conducting to the input of said control stage a trigger signal to initiate a marking operation, one output of said control stage carrying in normal position thereof a potential corresponding substantially to the potential which designates a device to be marked as being idle and carrying for the duration of said trigger signal blocking potential, potentials being extended for the duration of said trigger signal from another output of said control stage to all switching stages for causing the storage devices in switching stages designated by potential indicating a device to be marked as being idle to assume operated position, the duration of the blocking potential extended from said first named output exceeding the duration of the potentials extended from said second named output.

35. A structure and cooperation of parts according to claim 29, wherein said switching stages are structurally substantially similar and are serially related, control means for arbitrarily placing the zero point for the marking sequence effected by said switching stages, said control means comprising circuit means for interconnecting the coupling input of each switching stage with the coupling output of the respectively preceding switching stage, contact means included in the respective circuit means, the last of said switching stages thereby acting as the preceding stage with respect to the first switching stage, only one of said contact means being at any operating instant open to determine the arbitary zero point for the marking sequence to be effected, a control stage, and means for conducting to the input of said control stage a trigger signal to initiate a marking operation, one output of said control stage carrying in normal position thereof a potential corresponding substantially to the potential which designates a device to be marked as being idle and carrying for the duration of said trigger signal blocking potential, potentials being extended for the duration of said trigger signal from another output of said control stage to all switching stages for causing the storage devices in switching stages designated by potential indicating a device to be marked as being idle to assume operated position, the duration of the blocking potential extended from said first named output exceeding the duration of the potentials extended from said second named output.

36. A structure and cooperation of parts according to claim 32 in combination with means for connecting to the first named output the coupling input of the first switching stage.

37. A structure and cooperation of parts according to claim 11, in combination with means for connecting to the first named output the coupling input of the first switching stage.

38. A structure and cooperation of parts according to claim 31, in combination with contact means operating as switch-over contact means, each contact means being effective to connect in its normal position the coupling input of its respective switching stage with the coupling output of the respectively preceding switching stage and being in its actuated position effective to connect the coupling input of its respective switching stage with the output of said control stage.

39. A structure and cooperation of parts according to claim 28, wherein said switching stages are structurally substantially similar and are serially related, means for connecting the coupling input of each but the first switching stage directly with the coupling output of the respectively preceding switching stage, thereby providing for a marking sequence starting from a fixed zero point, a starting control stage disposed ahead of the coupling input of the first switching stage, and a blocking stage disposed at a point following the coupling output of the last switching stage, said blocking stage having two outputs which are respectively connected with the storage devices and with the means for providing the marking potential respectively disposed in all switching stages.

40. A structure and cooperation of parts according to claim 39, in combination with means for extending in each switching stage a control potential to the base electrode of the transistor which is directly connected to the testing input which control potential may assume two values, one of said values effecting flipping of said storage device responsive to a potential conducted to said second testing input and designating a device to be marked as being idle, and the other value preventing such flipping, and means for supplying said control potential from an output of said blocking stage.

41. A structure and cooperation of parts according to claim 40, in combination with a transistor in said blocking stage, means for connecting the base electrode of said transistor by way of a resistor to the coupling output of the switching stage acting as last switching stage and for also connecting said base electrode with another resistor disposed in parallel with a capacitor, means for connecting the emitter of said transistor to a voltage source and its collector to a first outlet and also connecting the collector with a further resistor which is connected with another voltage source, said transistor being of the same conduction type as the transistors of the respective switching stages which connect blocking potential to the respective coupling outputs of said switching stages, the potentials extended to said transistor in said blocking stage effecting in the presence of release potential at the coupling output of the switching stage acting as the last switching stage extension of a potential at the first output of said blocking stage for controlling the flipping of storage devices in the respective switching stages.

42. A structure and cooperation of parts according to claim 40, wherein the potential extended by way of a resistor to the base electrode of the transistor which is in each switching stage connected with the corresponding marking output may assume a value which is operative to prevent the operative actuation of said transistor, and means for supplying said potential from the second output of said blocking stage.

43. A structure and cooperation of parts according to claim 40, wherein the potential extended by way of a rectifier to the base electrode of the transistor which is in each switching stage connected with the corresponding marking output may assume two values, one such value being approximately equal to the value of the potential extended to said base electrode by way of a resistor and the other value being operative in pass direction of said rectifier to prevent the operative actuation of said transistor, and means for supplying said potential from the second output of said blocking stage.

44. A structure and cooperation of parts according to claim 43, in combination with a transistor in said blocking stage which is of a conduction type different from that of the transistors in such switching stages connecting with the respective coupling outputs of said switching stages, means for connecting the base electrode of said transistor in said blocking stage with the coupling output of the switching stage acting as the last switching stage by way of a resistor and also by way of another resistor with a voltage source, means for connecting the collector of said transistor acting as the second output of said blocking stage with a parallel circuit comprising a resistor and a capacitor and connected to another voltage source, and means for directly connecting the emitter of said transistor with a further voltage source, the potentials of said voltage sources effecting operative actuation of said transistor upon appearance of release potential on the coupling output of the last switching stage to effect thereby alteration of the potential at said second output to assume a value which prevents operative actuation of the transistors which are in said switching stages connected with the corresponding marking outputs.

45. A structure and cooperation of parts according to claim 43, wherein the starting control stage comprises a transistor with a conduction type opposite to that of the transistors connected in the respective switching stages to the corresponding coupling outputs, means for connecting the emitter of said transistor with the otutput of said control stage, means for connecting the base electrode thereof to a trigger signal input, and means for connecting the collector of said transistor with a voltage source having a potential which is approximately equal to the release potential.

46. A structure and cooperation of parts according to claim 38, in combination with a switch-over contact disposed ahead of the coupling input of each switching stage, said switch-over contact being in its normal position effective to connect the coupling output of the respectively preceding switching stage and being in its actuated position effective to connect the corresponding switching stage with said starting control stage, another contact cooperatively associated with said switch-over contact and being actuated simultaneously therewith, said other contact connecting the coupling output of the respective switching stage with said blocking stage, said contacts interconnecting said switching stages so as to dispose such switching stages in a chain circuit with the input thereof extending to said starting control stage and the output thereof extending to said blocking stage.

47. A structure and cooperation of parts according to claim 46, in combination with a counting chain which is for the control of said contacts incident to each marking operation stagewise advanced.

48. A structure and cooperation of parts according to claim 46, wherein said contacts are controlled by a storage device, whereby the contact which is open is disposed ahead of the switching stage which is associated with the device to be marked and following the device that had been marked.

49. A structure and cooperation of parts according to claim 30, in combination with auxiliary rectifier means disposed between coupling inputs of non-successive switching stages, the poling of said auxiliary rectifiers corresponding to the poling of the rectifiers disposed between the coupling inputs and coupling outputs of the respective switching stages, whereby the number of rectifiers disposed in series between desired coupling inputs does not exceed a predetermined freely selectable number.

50. In a signalling system, a selection circuit having a plurality of switching stages, each of said switching stages having, first, a testing input for receiving a potential signifying idle or busy condition, second, a marking output for extending a potential signifying neutral condition or marking condition, third, a coupling input and, fourth, a coupling output for respectively receiving and extending a potential signifying release or blocking, a first gate having a first input and a second input, said first input connected with said coupling input, and having an output connected with said coupling output, said first gate being responsive to connection of potential signifying busy condition to said testing input operative to deliver to said coupling output the release potential which had been connected to said coupling input, a second gate complementary to said first gate having a first input connected with said testing input and a second input connected with said coupling input and having an output connected with said marking output, said second gate being responsive to connection of the release potential to said coupling input operative to deliver the marking potential to said marking output, and an inverter having an input connected with said testing input and an output connected with the second input of said first gate.

51. In a signalling system, a selection circiut having a plurality of switching stages, each of said switching stages having, first, a testing input for receiving a potential signifying idle or busy condition, second, a marking output for extending a potential signifying neutral condition or marking condition, third, a coupling input and, fourth, a coupling output for respectively receiving and extending a potential signifying release or blocking, a first gate having a first input connected with said testing input and having a second input connected with said coupling input and having an output connected with said coupling output, said first gate being responsive to connection of the potential signifying busy condition to said testing input operative to deliver to said coupling output the release potential which had been connected to said coupling input, a second gate complementary to said first gate having a first input connected with said testing input and a second input connected with said coupling input and having an output connected with said marking output, said second gate being responsive to connection of the release potential to said coupling input operative to deliver the marking potential to said marking output, and an inverter having an input connected with said testing input and an output connected with the second input of said first gate.

52. In a signalling system, a selection circuit having a plurality of switching stages, each of said switching stages having, first, a testing input for receiving a potential signifying idle or busy condition, second, a marking output for extending a potential signifying neutral condition or marking condition, third, a coupling input and, fourth, a coupling output for respectively receiving and extending a potential signifying release or blocking, a first gate having a first input connected with said coupling input and a second input connected with said marking output and having an output connected with said coupling output, said first gate being responsive to connection of potential signifying busy condition to said testing input operative to deliver to said coupling output the release potential which had been connected to said coupling input, a second gate complementary to said first gate having a first input and a second input, said first input connected with said testing input, and having an output connected with said marking output, said second gate being responsive to connection of release potential to said coupling input and connection of potential signifying idle condition to said testing input operative to connect marking potential to said marking output, and an inverter having an input connected with said coupling input and having an output connected with the second input of said second gate.

53. In a signalling system, a selection circuit having a plurality of switching stages, each of said switching stages having, first, a testing input for receiving a potential signifying idle or busy condition, second, a marking output for extending a potential signifying neutral condition or marking condition, third, a coupling input and, fourth, a coupling output for respectively receiving and extending a potential signifying release or blocking, a first gate having a first input connected with said coupling input and a second input connected with said marking output and having an output connected with said coupling output, said first gate being responsive to connection of potential signifying busy condition to said testing input operative to connect to said coupling output the release potential which had been connected to said coupling input, a second gate complementary to said first gate having a first input connected to said testing input and a second input connected to said coupling input, said second gate being responsive to connection of the release potential to said coupling input and of potential signifying idle condition to said testing input operative to connect marking potential to said marking output, and an inverter having an input connected with the output of said second gate and an output connected with said marking output.

54. In a signalling system, a selection circuit having a plurality of switching stages, each of said switching stages having, first, a testing input for receiving a potential signifying idle or busy condition, second, a marking output for extending a potential signifying neutral condition or marking condition, third, a coupling input and, fourth, a coupling output for respectively receiving and extending a potential signifying release or blocking, a first gate having a first and a second input, said first input connected with said coupling input, and having an output connected with said coupling output, said first gate being responsive to connection of potential signifying busy condition to said testing input operative to connect to said coupling output the release potential which had been connected to said coupling input, a second gate complementary to said first gate and having a first input connected to said testing input and a second input connected to said coupling input and having an output connected to said marking output, said second gate being responsive to connection of release potential to said coupling input and connection of potential signifying idle condition to said testing input operative to connected marking potential to said marking output, and an inverter having an input connected with said marking output and an output connected with said second input of said first gate.

References Cited in the file of this patent
UNITED STATES PATENTS

| | | |
|---|---|---|
| 2,619,548 | Lesti | Nov. 25, 1952 |
| 2,840,705 | Scully | June 26, 1958 |
| 2,850,647 | Fliesher | Sept. 2, 1958 |
| 2,879,411 | Faulkner | Mar. 24, 1959 |
| 2,892,099 | Gray | June 23, 1959 |

OTHER REFERENCES

"Arithmetic Operations in Digital Computers," by R. K. Richards, D. Van Nostrand Co., Inc., Princeton, New Jersey (1955), pages 32, 36 and 86.